(12) United States Patent
Clark et al.

(10) Patent No.: US 8,713,511 B1
(45) Date of Patent: Apr. 29, 2014

(54) TOOLS AND METHODS FOR YIELD-AWARE SEMICONDUCTOR MANUFACTURING PROCESS TARGET GENERATION

(71) Applicant: SuVolta, Inc., Los Gatos, CA (US)

(72) Inventors: Lawrence T. Clark, Phoenix, AZ (US); Samuel Leshner, Los Gatos, CA (US)

(73) Assignee: SuVolta, Inc., Los Gatos, CA (US)

( * ) Notice: Subject to any disclaimer, the term of this patent is extended or adjusted under 35 U.S.C. 154(b) by 0 days.

(21) Appl. No.: 13/621,698

(22) Filed: Sep. 17, 2012

Related U.S. Application Data

(60) Provisional application No. 61/535,872, filed on Sep. 16, 2011.

(51) Int. Cl.
G06F 17/50 (2006.01)

(52) U.S. Cl.
USPC .......................... 716/136; 716/134

(58) Field of Classification Search
USPC ................................ 716/134, 136
See application file for complete search history.

(56) References Cited

U.S. PATENT DOCUMENTS

| | | |
|---|---|---|
| 3,958,266 A | 5/1976 | Athanas |
| 4,000,504 A | 12/1976 | Berger |
| 4,021,835 A | 5/1977 | Etoh et al. |
| 4,242,691 A | 12/1980 | Kotani et al. |
| 4,276,095 A | 6/1981 | Beilstein, Jr. et al. |
| 4,315,781 A | 2/1982 | Henderson |
| 4,518,926 A | 5/1985 | Swanson |
| 4,559,091 A | 12/1985 | Allen et al. |
| 4,578,128 A | 3/1986 | Mundt et al. |
| 4,617,066 A | 10/1986 | Vasudev |
| 4,662,061 A | 5/1987 | Malhi |
| 4,761,384 A | 8/1988 | Neppl et al. |

(Continued)

FOREIGN PATENT DOCUMENTS

| | | |
|---|---|---|
| EP | 0274278 | 7/1988 |
| EP | 0312237 | 4/1989 |

(Continued)

OTHER PUBLICATIONS

Abiko, H et al., "A Channel Engineering Combined with Channel Epitaxy Optimization and TED Suppression for 0.151 μm n-n Gate CMOS Technology", 1995 Symposium on VLSI Technology Digest of Technical Papers, pp. 23-24.

Chau, R et al., "A 50nm Depleted-Substrate CMOS Transistor (DST)", Electron Device Meeting 2001, IEDM Technical Digest, IEEE International, pp. 29.1.1-29.1.4.

(Continued)

*Primary Examiner* — Vuthe Siek
*Assistant Examiner* — Mohammed Alam
(74) *Attorney, Agent, or Firm* — Sterne, Kessler, Goldstein & Fox P.L.L.C.

(57) ABSTRACT

An integrated circuit having at least one array of circuit cells, each circuit cell having a plurality of transistors each performing a specified function, the transistors having predefined performance parameter margins for the specified function, the circuit cells designed by providing at least one operating condition for the circuit cell; providing a value of sigma over a predefined range; determining for each transistor, at least one variable transistor characteristic, which is defined by a semiconductor process that results in transistors having such transistor characteristics; providing an array of instances based upon the value of the sigma and using a design of experiments factorial calculation; providing a metric of interest by which to deter-nine pass/fail instances; extracting individual pass/fail instances for the metric of interest; and determining a yield for the array of circuit cells for the targeted operating condition.

20 Claims, 7 Drawing Sheets

(56) References Cited

U.S. PATENT DOCUMENTS

| | | | |
|---|---|---|---|
| 4,780,748 A | 10/1988 | Cunningham et al. |
| 4,819,043 A | 4/1989 | Yazawa et al. |
| 4,885,477 A | 12/1989 | Bird et al. |
| 4,908,681 A | 3/1990 | Nishida et al. |
| 4,945,254 A | 7/1990 | Robbins |
| 4,956,311 A | 9/1990 | Liou et al. |
| 5,034,337 A | 7/1991 | Mosher et al. |
| 5,144,378 A | 9/1992 | Hikosaka |
| 5,156,989 A | 10/1992 | Williams et al. |
| 5,156,990 A | 10/1992 | Mitchell |
| 5,166,765 A | 11/1992 | Lee et al. |
| 5,208,473 A | 5/1993 | Komori et al. |
| 5,294,821 A | 3/1994 | Iwamatsu |
| 5,298,763 A | 3/1994 | Shen et al. |
| 5,369,288 A | 11/1994 | Usuki |
| 5,373,186 A | 12/1994 | Schubert et al. |
| 5,384,476 A | 1/1995 | Nishizawa et al. |
| 5,426,328 A | 6/1995 | Yilmaz et al. |
| 5,444,008 A | 8/1995 | Han et al. |
| 5,552,332 A | 9/1996 | Tseng et al. |
| 5,559,368 A | 9/1996 | Hu et al. |
| 5,608,253 A | 3/1997 | Liu et al. |
| 5,622,880 A | 4/1997 | Burr et al. |
| 5,624,863 A | 4/1997 | Helm et al. |
| 5,625,568 A | 4/1997 | Edwards et al. |
| 5,641,980 A | 6/1997 | Yamaguchi et al. |
| 5,663,583 A | 9/1997 | Matloubian et al. |
| 5,712,501 A | 1/1998 | Davies et al. |
| 5,719,422 A | 2/1998 | Burr et al. |
| 5,726,488 A | 3/1998 | Watanabe et al. |
| 5,726,562 A | 3/1998 | Mizuno |
| 5,731,626 A | 3/1998 | Eaglesham et al. |
| 5,736,419 A | 4/1998 | Naem |
| 5,753,555 A | 5/1998 | Hada |
| 5,754,826 A | 5/1998 | Gamal et al. |
| 5,756,365 A | 5/1998 | Kakumu |
| 5,763,921 A | 6/1998 | Okumura et al. |
| 5,780,899 A | 7/1998 | Hu et al. |
| 5,847,419 A | 12/1998 | Imai et al. |
| 5,856,003 A | 1/1999 | Chiu |
| 5,861,334 A | 1/1999 | Rho |
| 5,877,049 A | 3/1999 | Liu et al. |
| 5,885,876 A | 3/1999 | Dennen |
| 5,889,315 A | 3/1999 | Farrenkopf et al. |
| 5,895,954 A | 4/1999 | Yasumura et al. |
| 5,899,714 A | 5/1999 | Farremkopf et al. |
| 5,918,129 A | 6/1999 | Fulford, Jr. et al. |
| 5,923,067 A | 7/1999 | Voldman |
| 5,923,987 A | 7/1999 | Burr |
| 5,936,868 A | 8/1999 | Hall |
| 5,946,214 A | 8/1999 | Heavlin et al. |
| 5,985,705 A | 11/1999 | Seliskar |
| 5,989,963 A | 11/1999 | Luning et al. |
| 6,001,695 A | 12/1999 | Wu |
| 6,020,227 A | 2/2000 | Bulucea |
| 6,043,139 A | 3/2000 | Eaglesham et al. |
| 6,060,345 A | 5/2000 | Hause et al. |
| 6,060,364 A | 5/2000 | Maszara et al. |
| 6,066,533 A | 5/2000 | Yu |
| 6,072,217 A | 6/2000 | Burr |
| 6,087,210 A | 7/2000 | Sohn |
| 6,087,691 A | 7/2000 | Hamamoto |
| 6,088,518 A | 7/2000 | Hsu |
| 6,091,286 A | 7/2000 | Blauschild |
| 6,096,611 A | 8/2000 | Wu |
| 6,103,562 A | 8/2000 | Son et al. |
| 6,121,153 A | 9/2000 | Kikkawa |
| 6,147,383 A | 11/2000 | Kuroda |
| 6,153,920 A | 11/2000 | Gossmann et al. |
| 6,157,073 A | 12/2000 | Lehongres |
| 6,175,582 B1 | 1/2001 | Naito et al. |
| 6,184,112 B1 | 2/2001 | Maszara et al. |
| 6,190,979 B1 | 2/2001 | Radens et al. |
| 6,194,259 B1 | 2/2001 | Nayak et al. |
| 6,198,157 B1 | 3/2001 | Ishida et al. |
| 6,218,892 B1 | 4/2001 | Soumyanath et al. |
| 6,218,895 B1 | 4/2001 | De et al. |
| 6,221,724 B1 | 4/2001 | Yu et al. |
| 6,229,188 B1 | 5/2001 | Aoki et al. |
| 6,232,164 B1 | 5/2001 | Tsai et al. |
| 6,235,597 B1 | 5/2001 | Miles |
| 6,245,618 B1 | 6/2001 | An et al. |
| 6,268,640 B1 | 7/2001 | Park et al. |
| 6,271,070 B2 | 8/2001 | Kotani et al. |
| 6,271,551 B1 | 8/2001 | Schmitz et al. |
| 6,288,429 B1 | 9/2001 | Iwata et al. |
| 6,297,132 B1 | 10/2001 | Zhang et al. |
| 6,300,177 B1 | 10/2001 | Sundaresan et al. |
| 6,313,489 B1 | 11/2001 | Letavic et al. |
| 6,319,799 B1 | 11/2001 | Ouyang et al. |
| 6,320,222 B1 | 11/2001 | Forbes et al. |
| 6,323,525 B1 | 11/2001 | Noguchi et al. |
| 6,326,666 B1 | 12/2001 | Bernstein et al. |
| 6,335,233 B1 | 1/2002 | Cho et al. |
| 6,358,806 B1 | 3/2002 | Puchner |
| 6,380,019 B1 | 4/2002 | Yu et al. |
| 6,391,752 B1 | 5/2002 | Colinge et al. |
| 6,426,260 B1 | 7/2002 | Hshieh |
| 6,426,279 B1 | 7/2002 | Huster et al. |
| 6,432,754 B1 | 8/2002 | Assaderaghi et al. |
| 6,444,550 B1 | 9/2002 | Hao et al. |
| 6,444,551 B1 | 9/2002 | Ku et al. |
| 6,449,749 B1 | 9/2002 | Stine |
| 6,461,920 B1 | 10/2002 | Shirahata |
| 6,461,928 B2 | 10/2002 | Rodder |
| 6,472,278 B1 | 10/2002 | Marshall et al. |
| 6,482,714 B1 | 11/2002 | Hieda et al. |
| 6,489,224 B1 | 12/2002 | Burr |
| 6,492,232 B1 | 12/2002 | Tang et al. |
| 6,500,739 B1 | 12/2002 | Wang et al. |
| 6,503,801 B1 | 1/2003 | Rouse et al. |
| 6,503,805 B2 | 1/2003 | Wang et al. |
| 6,506,640 B1 | 1/2003 | Ishida et al. |
| 6,518,623 B1 | 2/2003 | Oda et al. |
| 6,521,470 B1 | 2/2003 | Lin et al. |
| 6,534,373 B1 | 3/2003 | Yu |
| 6,541,328 B2 | 4/2003 | Whang et al. |
| 6,541,829 B2 | 4/2003 | Nishinohara et al. |
| 6,548,842 B1 | 4/2003 | Bulucea et al. |
| 6,551,885 B1 | 4/2003 | Yu |
| 6,552,377 B1 | 4/2003 | Yu |
| 6,573,129 B2 | 6/2003 | Hoke et al. |
| 6,576,535 B2 | 6/2003 | Drobny et al. |
| 6,600,200 B1 | 7/2003 | Lustig et al. |
| 6,620,671 B1 | 9/2003 | Wang et al. |
| 6,624,488 B1 | 9/2003 | Kim |
| 6,627,473 B1 | 9/2003 | Oikawa et al. |
| 6,630,710 B1 | 10/2003 | Augusto |
| 6,660,605 B1 | 12/2003 | Liu |
| 6,662,350 B2 | 12/2003 | Fried et al. |
| 6,667,200 B2 | 12/2003 | Sohn et al. |
| 6,670,260 B1 | 12/2003 | Yu et al. |
| 6,693,333 B1 | 2/2004 | Yu |
| 6,730,568 B2 | 5/2004 | Sohn |
| 6,737,724 B2 | 5/2004 | Hieda et al. |
| 6,743,291 B2 | 6/2004 | Ang et al. |
| 6,743,684 B2 | 6/2004 | Liu |
| 6,751,519 B1 | 6/2004 | Satya et al. |
| 6,753,230 B2 | 6/2004 | Sohn et al. |
| 6,760,900 B2 | 7/2004 | Rategh et al. |
| 6,770,944 B2 | 8/2004 | Nishinohara et al. |
| 6,787,424 B1 | 9/2004 | Yu |
| 6,797,553 B2 | 9/2004 | Adkisson et al. |
| 6,797,602 B1 | 9/2004 | Kluth et al. |
| 6,797,994 B1 | 9/2004 | Hoke et al. |
| 6,808,004 B2 | 10/2004 | Kamm et al. |
| 6,808,994 B2 | 10/2004 | Wang |
| 6,813,750 B2 | 11/2004 | Usami et al. |
| 6,821,825 B2 | 11/2004 | Todd et al. |
| 6,821,852 B2 | 11/2004 | Rhodes |
| 6,822,297 B2 | 11/2004 | Nandakumar et al. |
| 6,831,292 B2 | 12/2004 | Currie et al. |
| 6,835,639 B2 | 12/2004 | Rotondaro et al. |
| 6,852,602 B2 | 2/2005 | Kanzawa et al. |

(56) References Cited

U.S. PATENT DOCUMENTS

| | | | |
|---|---|---|---|
| 6,852,603 B2 | 2/2005 | Chakravarthi et al. |
| 6,881,641 B2 | 4/2005 | Wieczorek et al. |
| 6,881,987 B2 | 4/2005 | Sohn |
| 6,891,439 B2 | 5/2005 | Jachne et al. |
| 6,893,947 B2 | 5/2005 | Martinez et al. |
| 6,900,519 B2 | 5/2005 | Cantell et al. |
| 6,901,564 B2 | 5/2005 | Stine et al. |
| 6,916,698 B2 | 7/2005 | Mocuta et al. |
| 6,917,237 B1 | 7/2005 | Tschanz et al. |
| 6,927,463 B2 | 8/2005 | Iwata et al. |
| 6,928,128 B1 | 8/2005 | Sidiropoulos |
| 6,930,007 B2 | 8/2005 | Bu et al. |
| 6,930,360 B2 | 8/2005 | Yamauchi et al. |
| 6,957,163 B2 | 10/2005 | Ando |
| 6,963,090 B2 | 11/2005 | Passlack et al. |
| 6,995,397 B2 | 2/2006 | Yamashita et al. |
| 7,002,214 B1 | 2/2006 | Boyd et al. |
| 7,008,836 B2 | 3/2006 | Algotsson et al. |
| 7,013,359 B1 | 3/2006 | Li |
| 7,015,546 B2 | 3/2006 | Herr et al. |
| 7,015,741 B2 | 3/2006 | Tschanz et al. |
| 7,022,559 B2 | 4/2006 | Barnak et al. |
| 7,036,098 B2 | 4/2006 | Eleyan et al. |
| 7,038,258 B2 | 5/2006 | Liu et al. |
| 7,039,881 B2 | 5/2006 | Regan |
| 7,045,456 B2 | 5/2006 | Murto et al. |
| 7,057,216 B2 | 6/2006 | Ouyang et al. |
| 7,061,058 B2 | 6/2006 | Chakravarthi et al. |
| 7,064,039 B2 | 6/2006 | Liu |
| 7,064,399 B2 | 6/2006 | Babcock et al. |
| 7,071,103 B2 | 7/2006 | Chan et al. |
| 7,078,325 B2 | 7/2006 | Curello et al. |
| 7,078,776 B2 | 7/2006 | Nishinohara et al. |
| 7,089,513 B2 | 8/2006 | Bard et al. |
| 7,089,515 B2 | 8/2006 | Hanafi et al. |
| 7,091,093 B1 | 8/2006 | Noda et al. |
| 7,105,399 B1 | 9/2006 | Dakshina-Murthy et al. |
| 7,109,099 B2 | 9/2006 | Tan et al. |
| 7,119,381 B2 | 10/2006 | Passlack |
| 7,122,411 B2 | 10/2006 | Mouli |
| 7,127,687 B1 | 10/2006 | Signore |
| 7,132,323 B2 | 11/2006 | Haensch et al. |
| 7,169,675 B2 | 1/2007 | Tan et al. |
| 7,170,120 B2 | 1/2007 | Datta et al. |
| 7,176,137 B2 | 2/2007 | Perng et al. |
| 7,186,598 B2 | 3/2007 | Yamauchi et al. |
| 7,189,627 B2 | 3/2007 | Wu et al. |
| 7,199,430 B2 | 4/2007 | Babcock et al. |
| 7,202,517 B2 | 4/2007 | Dixit et al. |
| 7,208,354 B2 | 4/2007 | Bauer |
| 7,211,871 B2 | 5/2007 | Cho |
| 7,221,021 B2 | 5/2007 | Wu et al. |
| 7,223,646 B2 | 5/2007 | Miyashita et al. |
| 7,226,833 B2 | 6/2007 | White et al. |
| 7,226,843 B2 | 6/2007 | Weber et al. |
| 7,230,680 B2 | 6/2007 | Fujisawa et al. |
| 7,235,822 B2 | 6/2007 | Li |
| 7,256,639 B1 | 8/2007 | Koniaris et al. |
| 7,259,428 B2 | 8/2007 | Inaba |
| 7,260,562 B2 | 8/2007 | Czajkowski et al. |
| 7,294,877 B2 | 11/2007 | Rueckes et al. |
| 7,297,994 B2 | 11/2007 | Wieczorek et al. |
| 7,301,208 B2 | 11/2007 | Handa et al. |
| 7,304,350 B2 | 12/2007 | Misaki |
| 7,307,471 B2 | 12/2007 | Gammie et al. |
| 7,312,500 B2 | 12/2007 | Miyashita et al. |
| 7,323,754 B2 | 1/2008 | Ema et al. |
| 7,332,439 B2 | 2/2008 | Lindert et al. |
| 7,348,629 B2 | 3/2008 | Chu et al. |
| 7,354,833 B2 | 4/2008 | Liaw |
| 7,380,225 B2 | 5/2008 | Joshi et al. |
| 7,398,497 B2 | 7/2008 | Sato et al. |
| 7,402,207 B1 | 7/2008 | Besser et al. |
| 7,402,872 B2 | 7/2008 | Murthy et al. |
| 7,416,605 B2 | 8/2008 | Zollner et al. |
| 7,427,788 B2 | 9/2008 | Li et al. |
| 7,442,971 B2 | 10/2008 | Wirbeleit et al. |
| 7,449,733 B2 | 11/2008 | Inaba et al. |
| 7,462,908 B2 | 12/2008 | Bol et al. |
| 7,469,164 B2 | 12/2008 | Du-Nour |
| 7,470,593 B2 | 12/2008 | Rouh et al. |
| 7,485,536 B2 | 2/2009 | Jin et al. |
| 7,487,474 B2 | 2/2009 | Ciplickas et al. |
| 7,491,988 B2 | 2/2009 | Tolchinsky et al. |
| 7,494,861 B2 | 2/2009 | Chu et al. |
| 7,496,862 B2 | 2/2009 | Chang et al. |
| 7,496,867 B2 | 2/2009 | Turner et al. |
| 7,498,637 B2 | 3/2009 | Yamaoka et al. |
| 7,501,324 B2 | 3/2009 | Babcock et al. |
| 7,503,020 B2 | 3/2009 | Allen et al. |
| 7,507,999 B2 | 3/2009 | Kusumoto et al. |
| 7,514,766 B2 | 4/2009 | Yoshida |
| 7,521,323 B2 | 4/2009 | Surdeanu et al. |
| 7,531,393 B2 | 5/2009 | Doyle et al. |
| 7,531,836 B2 | 5/2009 | Liu et al. |
| 7,538,364 B2 | 5/2009 | Twynam |
| 7,538,412 B2 | 5/2009 | Schulze et al. |
| 7,562,233 B1 | 7/2009 | Sheng et al. |
| 7,564,105 B2 | 7/2009 | Chi et al. |
| 7,566,600 B2 | 7/2009 | Mouli |
| 7,569,456 B2 | 8/2009 | Ko et al. |
| 7,580,823 B2 * | 8/2009 | Jakatdar et al. ............ 703/13 |
| 7,586,322 B1 | 9/2009 | Xu et al. |
| 7,592,241 B2 | 9/2009 | Takao |
| 7,595,243 B1 | 9/2009 | Bulucea et al. |
| 7,598,142 B2 | 10/2009 | Ranade et al. |
| 7,605,041 B2 | 10/2009 | Ema et al. |
| 7,605,060 B2 | 10/2009 | Meunier-Beillard et al. |
| 7,605,429 B2 | 10/2009 | Bernstein et al. |
| 7,608,496 B2 | 10/2009 | Chu |
| 7,615,802 B2 | 11/2009 | Elpelt et al. |
| 7,622,341 B2 | 11/2009 | Chudzik et al. |
| 7,638,380 B2 | 12/2009 | Pearce |
| 7,642,140 B2 | 1/2010 | Bae et al. |
| 7,644,377 B1 | 1/2010 | Saxe et al. |
| 7,645,665 B2 | 1/2010 | Kubo et al. |
| 7,651,920 B2 | 1/2010 | Siprak |
| 7,655,523 B2 | 2/2010 | Babcock et al. |
| 7,673,273 B2 | 3/2010 | Madurawe et al. |
| 7,675,126 B2 | 3/2010 | Cho |
| 7,675,317 B2 | 3/2010 | Perisetty |
| 7,678,638 B2 | 3/2010 | Chu et al. |
| 7,681,628 B2 | 3/2010 | Joshi et al. |
| 7,682,887 B2 | 3/2010 | Dokumaci et al. |
| 7,683,442 B1 | 3/2010 | Burr et al. |
| 7,696,000 B2 | 4/2010 | Liu et al. |
| 7,704,822 B2 | 4/2010 | Jeong |
| 7,704,844 B2 | 4/2010 | Zhu et al. |
| 7,709,828 B2 | 5/2010 | Braithwaite et al. |
| 7,723,750 B2 | 5/2010 | Zhu et al. |
| 7,737,472 B2 | 6/2010 | Kondo et al. |
| 7,741,138 B2 | 6/2010 | Cho |
| 7,741,200 B2 | 6/2010 | Cho et al. |
| 7,745,270 B2 | 6/2010 | Shah et al. |
| 7,750,374 B2 | 7/2010 | Capasso et al. |
| 7,750,381 B2 | 7/2010 | Hokazono et al. |
| 7,750,405 B2 | 7/2010 | Nowak |
| 7,750,682 B2 | 7/2010 | Bernstein et al. |
| 7,755,144 B2 | 7/2010 | Li et al. |
| 7,755,146 B2 | 7/2010 | Helm et al. |
| 7,759,206 B2 | 7/2010 | Luo et al. |
| 7,759,714 B2 | 7/2010 | Itoh et al. |
| 7,761,820 B2 | 7/2010 | Berger et al. |
| 7,795,677 B2 | 9/2010 | Bangsaruntip et al. |
| 7,808,045 B2 | 10/2010 | Kawahara et al. |
| 7,808,410 B2 | 10/2010 | Kim et al. |
| 7,811,873 B2 | 10/2010 | Mochizuki |
| 7,811,881 B2 | 10/2010 | Cheng et al. |
| 7,818,702 B2 | 10/2010 | Mandelman et al. |
| 7,821,066 B2 | 10/2010 | Lebby et al. |
| 7,829,402 B2 | 11/2010 | Matocha et al. |
| 7,831,873 B1 | 11/2010 | Trimberger et al. |
| 7,846,822 B2 | 12/2010 | Seebauer et al. |
| 7,855,118 B2 | 12/2010 | Hoentschel et al. |

(56) References Cited

U.S. PATENT DOCUMENTS

| | | | |
|---|---|---|---|
| 7,859,013 B2 | 12/2010 | Chen et al. |
| 7,863,163 B2 | 1/2011 | Bauer |
| 7,867,835 B2 | 1/2011 | Lee et al. |
| 7,883,977 B2 | 2/2011 | Babcock et al. |
| 7,888,205 B2 | 2/2011 | Herner et al. |
| 7,888,747 B2 | 2/2011 | Hokazono |
| 7,895,546 B2 | 2/2011 | Lahner et al. |
| 7,897,495 B2 | 3/2011 | Ye et al. |
| 7,906,413 B2 | 3/2011 | Cardone et al. |
| 7,906,813 B2 | 3/2011 | Kato |
| 7,910,419 B2 | 3/2011 | Fenouillet-Beranger et al. |
| 7,919,791 B2 | 4/2011 | Flynn et al. |
| 7,926,018 B2 | 4/2011 | Moroz et al. |
| 7,935,984 B2 | 5/2011 | Nakano |
| 7,941,776 B2 | 5/2011 | Majumder et al. |
| 7,945,800 B2 | 5/2011 | Gomm et al. |
| 7,948,008 B2 | 5/2011 | Liu et al. |
| 7,952,147 B2 | 5/2011 | Ueno et al. |
| 7,960,232 B2 | 6/2011 | King et al. |
| 7,960,238 B2 | 6/2011 | Kohli et al. |
| 7,968,400 B2 | 6/2011 | Cai |
| 7,968,411 B2 | 6/2011 | Williford |
| 7,968,440 B2 | 6/2011 | Seebauer |
| 7,968,459 B2 | 6/2011 | Bedell et al. |
| 7,989,900 B2 | 8/2011 | Haensch et al. |
| 7,994,573 B2 | 8/2011 | Pan |
| 8,004,024 B2 | 8/2011 | Furukawa et al. |
| 8,012,827 B2 | 9/2011 | Yu et al. |
| 8,029,620 B2 | 10/2011 | Kim et al. |
| 8,039,332 B2 | 10/2011 | Bernard et al. |
| 8,046,598 B2 | 10/2011 | Lee |
| 8,048,791 B2 | 11/2011 | Hargrove et al. |
| 8,048,810 B2 | 11/2011 | Tsai et al. |
| 8,051,340 B2 | 11/2011 | Cranford, Jr. et al. ............... 1/1 |
| 8,053,340 B2 | 11/2011 | Colombeau et al. |
| 8,063,466 B2 | 11/2011 | Kurita |
| 8,067,279 B2 | 11/2011 | Sadra et al. |
| 8,067,280 B2 | 11/2011 | Wang et al. |
| 8,067,302 B2 | 11/2011 | Li |
| 8,076,719 B2 | 12/2011 | Zeng et al. |
| 8,097,529 B2 | 1/2012 | Krull et al. |
| 8,103,983 B2 | 1/2012 | Agarwal et al. |
| 8,105,891 B2 | 1/2012 | Yeh et al. |
| 8,106,424 B2 | 1/2012 | Schruefer |
| 8,106,481 B2 | 1/2012 | Rao |
| 8,110,487 B2 | 2/2012 | Griebenow et al. |
| 8,114,761 B2 | 2/2012 | Mandrekar et al. |
| 8,119,482 B2 | 2/2012 | Bhalla et al. |
| 8,120,069 B2 | 2/2012 | Hynecek |
| 8,129,246 B2 | 3/2012 | Babcock et al. |
| 8,129,797 B2 | 3/2012 | Chen et al. |
| 8,134,159 B2 | 3/2012 | Hokazono |
| 8,143,120 B2 | 3/2012 | Kerr et al. |
| 8,143,124 B2 | 3/2012 | Challa et al. |
| 8,143,678 B2 | 3/2012 | Kim et al. |
| 8,148,774 B2 | 4/2012 | Mori et al. |
| 8,163,619 B2 | 4/2012 | Yang et al. |
| 8,169,002 B2 | 5/2012 | Chang et al. |
| 8,170,857 B2 | 5/2012 | Joshi et al. |
| 8,173,499 B2 | 5/2012 | Chung et al. |
| 8,173,502 B2 | 5/2012 | Yan et al. |
| 8,176,461 B1 | 5/2012 | Trimberger |
| 8,178,430 B2 | 5/2012 | Kim et al. |
| 8,179,530 B2 | 5/2012 | Levy et al. |
| 8,183,096 B2 | 5/2012 | Wirbeleit |
| 8,183,107 B2 | 5/2012 | Mathur et al. |
| 8,185,865 B2 | 5/2012 | Gupta et al. |
| 8,187,959 B2 | 5/2012 | Pawlak et al. |
| 8,188,542 B2 | 5/2012 | Yoo et al. |
| 8,196,545 B2 | 6/2012 | Kurosawa |
| 8,201,122 B2 | 6/2012 | Dewey, III et al. |
| 8,214,190 B2 | 7/2012 | Joshi et al. |
| 8,217,423 B2 | 7/2012 | Liu et al. |
| 8,225,255 B2 | 7/2012 | Ouyang et al. |
| 8,227,307 B2 | 7/2012 | Chen et al. |
| 8,236,661 B2 | 8/2012 | Dennard et al. |
| 8,239,803 B2 | 8/2012 | Kobayashi |
| 8,247,300 B2 | 8/2012 | Babcock et al. |
| 8,255,843 B2 | 8/2012 | Chen et al. |
| 8,258,026 B2 | 9/2012 | Bulucea |
| 8,286,180 B2 | 10/2012 | Foo |
| 8,288,798 B2 | 10/2012 | Passlack |
| 8,299,562 B2 | 10/2012 | Li et al. |
| 8,324,059 B2 | 12/2012 | Guo et al. |
| 8,336,010 B1 * | 12/2012 | Chang et al. .................. 716/108 |
| 2001/0014495 A1 | 8/2001 | Yu |
| 2002/0023329 A1 * | 2/2002 | Nulman .................... 29/25.01 |
| 2002/0042184 A1 | 4/2002 | Nandakumar et al. |
| 2003/0006415 A1 | 1/2003 | Yokogawa et al. |
| 2003/0047763 A1 | 3/2003 | Hieda et al. |
| 2003/0122203 A1 | 7/2003 | Nishinohara et al. |
| 2003/0173626 A1 | 9/2003 | Burr |
| 2003/0183856 A1 | 10/2003 | Wieczorek et al. |
| 2003/0215992 A1 | 11/2003 | Sohn et al. |
| 2004/0075118 A1 | 4/2004 | Heinemann et al. |
| 2004/0075143 A1 | 4/2004 | Bae et al. |
| 2004/0084731 A1 | 5/2004 | Matsuda et al. |
| 2004/0087090 A1 | 5/2004 | Grudowski et al. |
| 2004/0126947 A1 | 7/2004 | Sohn |
| 2004/0175893 A1 | 9/2004 | Vatus et al. |
| 2004/0180488 A1 | 9/2004 | Lee |
| 2005/0056877 A1 | 3/2005 | Rueckes et al. |
| 2005/0106824 A1 | 5/2005 | Alberto et al. |
| 2005/0116282 A1 | 6/2005 | Pattanayak et al. |
| 2005/0250289 A1 | 11/2005 | Babcock et al. |
| 2005/0280075 A1 | 12/2005 | Ema et al. |
| 2006/0017100 A1 | 1/2006 | Bol et al. |
| 2006/0022270 A1 | 2/2006 | Boyd et al. |
| 2006/0049464 A1 | 3/2006 | Rao |
| 2006/0068555 A1 | 3/2006 | Zhu et al. |
| 2006/0068586 A1 | 3/2006 | Pain |
| 2006/0071278 A1 | 4/2006 | Takao |
| 2006/0091481 A1 | 5/2006 | Li et al. |
| 2006/0154428 A1 | 7/2006 | Dokumaci |
| 2006/0157794 A1 | 7/2006 | Doyle et al. |
| 2006/0161452 A1 * | 7/2006 | Hess .............................. 705/1 |
| 2006/0197158 A1 | 9/2006 | Babcock et al. |
| 2006/0203581 A1 | 9/2006 | Joshi et al. |
| 2006/0220114 A1 | 10/2006 | Miyashita et al. |
| 2006/0223248 A1 | 10/2006 | Venugopal et al. |
| 2007/0040222 A1 | 2/2007 | Van Camp et al. |
| 2007/0117326 A1 | 5/2007 | Tan et al. |
| 2007/0158790 A1 | 7/2007 | Rao |
| 2007/0212861 A1 | 9/2007 | Chidambarrao et al. |
| 2007/0238253 A1 | 10/2007 | Tucker |
| 2008/0028349 A1 * | 1/2008 | Muranaka ....................... 716/5 |
| 2008/0067589 A1 | 3/2008 | Ito et al. |
| 2008/0108208 A1 | 5/2008 | Arevalo et al. |
| 2008/0138953 A1 | 6/2008 | Challa et al. |
| 2008/0169493 A1 | 7/2008 | Lee et al. |
| 2008/0169516 A1 | 7/2008 | Chung |
| 2008/0197439 A1 | 8/2008 | Goerlach et al. |
| 2008/0227250 A1 | 9/2008 | Ranade et al. |
| 2008/0237661 A1 | 10/2008 | Ranade et al. |
| 2008/0258198 A1 | 10/2008 | Bojarczuk et al. |
| 2008/0272409 A1 | 11/2008 | Sonkusale et al. |
| 2009/0003105 A1 | 1/2009 | Itoh et al. |
| 2009/0057746 A1 | 3/2009 | Sugll et al. |
| 2009/0057762 A1 | 3/2009 | Bangsaruntip et al. |
| 2009/0108350 A1 | 4/2009 | Cai et al. |
| 2009/0121298 A1 | 5/2009 | Furukawa et al. |
| 2009/0134468 A1 | 5/2009 | Tsuchiya et al. |
| 2009/0224319 A1 | 9/2009 | Kohli |
| 2009/0302388 A1 | 12/2009 | Cai et al. |
| 2009/0309140 A1 | 12/2009 | Khamankar et al. |
| 2009/0311837 A1 | 12/2009 | Kapoor |
| 2009/0321849 A1 | 12/2009 | Miyamura et al. |
| 2010/0012988 A1 | 1/2010 | Yang et al. |
| 2010/0038724 A1 | 2/2010 | Anderson et al. |
| 2010/0100856 A1 | 4/2010 | Mittal |
| 2010/0148153 A1 | 6/2010 | Hudait et al. |
| 2010/0149854 A1 | 6/2010 | Vora |
| 2010/0187641 A1 | 7/2010 | Zhu et al. |
| 2010/0207182 A1 | 8/2010 | Paschal |

(56) References Cited

U.S. PATENT DOCUMENTS

| | | | |
|---|---|---|---|
| 2010/0228370 | A1* | 9/2010 | Tsen et al. .................. 700/103 |
| 2010/0270600 | A1 | 10/2010 | Inukai et al. |
| 2011/0059588 | A1 | 3/2011 | Kang |
| 2011/0073961 | A1 | 3/2011 | Dennard et al. |
| 2011/0074498 | A1 | 3/2011 | Thompson et al. |
| 2011/0079860 | A1 | 4/2011 | Verhulst |
| 2011/0079861 | A1 | 4/2011 | Shifren et al. |
| 2011/0095811 | A1 | 4/2011 | Chi et al. |
| 2011/0147828 | A1 | 6/2011 | Murthy et al. |
| 2011/0169082 | A1 | 7/2011 | Zhu et al. |
| 2011/0175170 | A1 | 7/2011 | Wang et al. |
| 2011/0180880 | A1 | 7/2011 | Chudzik et al. |
| 2011/0193164 | A1 | 8/2011 | Zhu |
| 2011/0212590 | A1 | 9/2011 | Wu et al. |
| 2011/0230039 | A1 | 9/2011 | Mowry et al. |
| 2011/0242921 | A1 | 10/2011 | Tran et al. |
| 2011/0248352 | A1 | 10/2011 | Shifren |
| 2011/0294278 | A1 | 12/2011 | Eguchi et al. |
| 2011/0307846 | A1* | 12/2011 | Culp et al. .................. 716/56 |
| 2011/0309447 | A1 | 12/2011 | Arghavani et al. |
| 2012/0021594 | A1 | 1/2012 | Gurtej et al. |
| 2012/0034745 | A1 | 2/2012 | Colombeau et al. |
| 2012/0056275 | A1 | 3/2012 | Cai et al. |
| 2012/0065920 | A1 | 3/2012 | Nagumo et al. |
| 2012/0108050 | A1 | 5/2012 | Chen et al. |
| 2012/0132998 | A1 | 5/2012 | Kwon et al. |
| 2012/0138953 | A1 | 6/2012 | Cai et al. |
| 2012/0146155 | A1 | 6/2012 | Hoentschel et al. |
| 2012/0167025 | A1 | 6/2012 | Gillespie et al. |
| 2012/0187491 | A1 | 7/2012 | Zhu et al. |
| 2012/0190177 | A1 | 7/2012 | Kim et al. |
| 2012/0223363 | A1 | 9/2012 | Kronholz et al. |

FOREIGN PATENT DOCUMENTS

| | | |
|---|---|---|
| EP | 0531621 | 3/1993 |
| EP | 0683515 | 11/1995 |
| EP | 0889502 | 1/1999 |
| EP | 1450394 | 8/2004 |
| JP | 59193066 | 11/1984 |
| JP | 4186774 | 7/1992 |
| JP | 8153873 | 6/1996 |
| JP | 8288508 | 11/1996 |
| JP | 2004087671 | 3/2004 |
| KR | 794094 | 1/2008 |
| WO | WO2009/000934 | 12/2008 |
| WO | WO2011/062788 | 5/2011 |

OTHER PUBLICATIONS

Ducroquet, F et al. "Fully Depleted Silicon-On-Insulator nMOSFETs with Tensile Strained High Carbon Content $Si_{1-y}C_y$ Channel", ECS 210th Meeting, Abstract 1033, 2006.

Ernst, T et al., "Nanoscaled MOSFET Transistors on Strained Si, SiGe, Ge Layers: Some Integration and Electrcal Properties Features", ECS Trans. 2006, vol. 3, Issue 7, pp. 947-961.

Goesele, U et al., Diffusion Engineering by Carbon in Silicon, Mat. Res. Soc. Symp. vol. 610, 2000.

Hokazono, A et al., "Steep Channel & Halo Profiles Utilizing Boron-Diffusion-Barrier Layers (Si:C) for 32 nm Node and Beyond", 2008 Symposium on VLSI Technology Digest of Technical Papers, pp. 112-113, 2008.

Hokazono, A et al., "Steep Channel Profiles in n/pMOS Controlled by Boron-Doped Si:C Layers for Continual Bulk-CMOS Scaling", IEDM09-676 Symposium, pp. 29.1.1-29.1.4, 2009.

Holland, OW and Thomas, DK "A Method to Improve Activation of Implanted Dopants in SiC", Oak Ridge National Laboratory, Oak Ridge, TN, 2001.

Kotaki, H., et al., "Novel Bulk Dynamic Threshold Voltage MOSFET (B-DTMOS) with Advanced Isolation (SITOS) and Gate to Shallow-Well Contact (SSS-C) Processes for Ultra Low Power Dual Gate CMOS", IEDM 96, pp. 459-462, 1996.

Lavéant, P. "Incorporation, Diffusion and Agglomeration of Carbon in Silicon", Solid State Phenomena, vols. 82-84, pp. 189-194, 2002.

Noda, K et al., "A 0.1-μm Delta-Doped MOSFET Fabricated with Post-Low-Energy Implanting Selective Epitaxy" IEEE Transactions on Electron Devices, vol. 45, No. 4, pp. 809-814, Apr. 1998.

Ohguro, T et al., "An 0.18-μm CMOS for Mixed Digital and Analog Aplications with Zero-Volt-Vth Epitaxial-Channel MOSFET's", IEEE Transactions on Electron Devices, vol. 46, No. 7, pp. 1378-1383, Jul. 1999.

Pinacho, R et al., "Carbon in Silicon: Modeling of Diffusion and Clustering Mechanisms", Journal of Applied Physics, vol. 92, No. 3, pp. 1582-1588, Aug. 2002.

Robertson, LS et al., "The Effect of Impurities on Diffusion and Activation of Ion Implanted Boron in Silicon", Mat. Res. Soc. Symp. vol. 610, 2000.

Scholz, R et al., "Carbon-Induced Undersaturation of Silicon Self-Interstitials", Appl. Phys. Lett. 72(2), pp. 200-202, Jan. 1998.

Scholz, RF et al., "The Contribution of Vacancies to Carbon Out-Diffusion in Silicon", Appl. Phys. Lett., vol. 74, No. 3, pp. 392-394, Jan. 1999.

Stolk, PA et al., "Physical Mechanisms of Transient Enhanced Dopant Diffusion in Ion-Implanted Silicon", J. Appl. Phys. 81(9), pp. 6031-6050, May 1997.

Thompson, S et al., "MOS Scaling: Transistor Challenges for the 21st Century", Intel Technology Journal Q3' 1998, pp. 1-19, 1998.

Wann, C. et al., "Channel Profile Organization and Device Design for Low-Power High-Performance Dynamic Threshold MOSFET", IEDM 96, pp. 113-116, 1996.

Werner, P et al., "Carbon Diffusion in Silicon", Applied Physics Letters, vol. 73, No. 17, pp. 2465-2467, Oct. 1998.

Yan, Ran-Hong et al., "Scaling the Si MOSFET: From Bulk to SOI to Bulk", IEEE Transactions on Electron Devices, vol. 39, No. 7, Jul. 1992.

Komaragiri, R. et al., "Depletion-Free Poly Gate Electrode Architecture for Sub 100 Nanometer CMOS Devices with High-K Gate Dielectrics," IEEE IEDM Tech Dig., San Francisco CA, 833-836, Dec. 13-15, 2004, Dec. 2004.

Samsudin, K et al., "Integrating Intrinsic Parameter Fluctuation Description into BSIMSOI to Forecast sub-15nm UTB SOI based 6T SRAM Operation", Solid-State Electronics (50), pp. 86-93 (2006).

Wong, H et al., "Nanoscale CMOS", Proceedings of the IEEE, Vo. 87, No. 4, pp. 537-370 (Apr. 1999).

Banerjee, et al. "Compensating Non-Optical Effects using Electrically-Driven Optical Proximity Correction", Proc. of SPIE vol. 7275 72750E (2009).

Cheng, et al. "Extremely Thin SOI (ETSOI) CMOS with Record Low Variability for Low Power System-on-Chip Applications", Electron Devices Meeting (IEDM) (Dec. 2009).

Cheng, et al. "Fully Depleted Extremely Thin SOI Technology Fabricated by a Novel Integration Scheme Feturing Implant-Free, Zero-Silicon-Loss, and Faceted Raised Source/Drain", Symposium on VLSI Technology Digest of Technical Papers, pp. 212-213 (2009).

Drennan, et al. "Implications of Proximity Effects for Analog Design", Custom Integrated Circuits Conference, pp. 169-176 (Sep. 2006).

Hook, et al. "Lateral Ion Implant Straggle and Mask Proximity Effect", IEEE Transactions on Electron Devices, vol. 50, No. 9, pp. 1946-1951 (Sep. 2003).

Hori, et al. "A 0.1 μm CMOS with a Step Channel Profile Formed by Ultra High Vacuum CVD and In-Situ-Doped Ions", Proceeding of the International Electron Devices Meeting, New York, IEEE, US, pp. 909-911 (Dec. 5, 1993).

Matshuashi, et al. "High-Performance Double-Layer Epitaxial-Channel PMOSFET Compatible with a Single Gate CMOSFET", Symposium on VLSI Technology Digest of Technical Papers, pp. 36-37 (1996).

Shao, et al., "Boron Diffusion in Silicon: The Anomalies and Control by Point Defect Engineering", Materials Science and Engineering R: Reports, vol. 42, No. 3-4, pp. 65-114 (Nov. 2003).

Sheu, et al. "Modeling the Well-Edge Proximity Effect in Highly Scaled MOSFETs", IEEE Transactions on Electron Devices, vol. 53, No. 11, pp. 2792-2798 (Nov. 2006).

* cited by examiner

TOOLS AND METHODS FOR YIELD-AWARE SEMICONDUCTOR MANUFACTURING PROCESS TARGET GENERATION

CROSS-REFERENCE TO RELATED APPLICATIONS

This non-provisional application claims the benefit of U.S. Provisional Application 61/535,872, entitled, "Integrated Circuit Devices and Methods for Achieving a Target Objective", and filed 16 Sep. 2011, the entirety of which is hereby incorporated by reference.

INCORPORATION BY REFERENCE OF ADDITIONAL DOCUMENTS

In addition to the provisional application referred to above, the following are incorporated herein by reference: U.S. patent application Ser. No. 12/708,497, filed 18 Feb. 2010, titled "Electronic Devices and Systems, and Methods for Making and Using the Same;" U.S. patent application Ser. No. 12/971,884, filed 17 Dec. 2010, titled "Low Power Semiconductor Transistor Structure and Method of Fabrication Thereof;" U.S. patent application Ser. No. 12/971,955 filed 17 Dec. 2010, titled "Transistor with Threshold Voltage Set Notch and Method of Fabrication Thereof;" OS patent application Ser. No. 12/895,785 filed 30 Sep. 2010, titled "Advanced Transistors With Threshold Voltage Set Dopant Structures;" U.S. patent application Ser. No. 13/459,971, filed 30 Apr. 2012, titled "Multiple Transistor Types Formed in a Common Epitaxial Layer by Differential Out Diffusion from a Doped Underlayer;" U.S. patent application Ser. No. 13/592,122, filed 22 Aug. 2012, titled "Porting a Circuit Design from a First Semiconductor Process to a Second Semiconductor Process," the entirety of these disclosures is hereby incorporated by reference.

FIELD OF THE INVENTION

The present invention relates generally to integrated circuits and methods of designing integrated circuits for manufacture in a semiconductor process.

BACKGROUND

Integrated circuit design typically begins with the knowledge of a design goal or specification. Such specifications describe the required performance of the circuit(s) to be designed. Integrated circuit designers typically first create a computer model of a circuit design that will meet the performance specification. That circuit design model is based upon the electrical circuit elements that are available in a given semiconductor manufacturing process. For example, electrical circuit elements may include diodes, transistors, capacitors, resistors, and so on. Typical modern integrated circuits include both p-channel field effect transistors and n-channel field effect transistors. Integrated circuits that include both p-channel field effect transistors and n-channel field effect transistors are referred to as CMOS integrated circuits.

It is common in semiconductor process technology nodes from about 45 nm and beyond, to find that a substantial amount of static power in CMOS integrated circuits is attributable to off-state leakage current in the transistors. The power consumption that results from this unwanted leakage current is undesirable, and consequently designers seek to reduce the power consumption due to leakage current.

One approach to reducing leakage current is to re-design the circuitry of an integrated circuit. Regardless of whether such a re-design can reduce leakage current without reducing performance, a high cost will be incurred in re-tooling the design. As is known in the field of integrated circuit design, the cost of preparing masks and fabricating integrated circuits with those mask sets is very high. In view of the high cost of re-designing an integrated circuit, designers desire to re-use their circuit designs (both transistor network topologies and physical layout). Circuit design re-use may reduce non-recurring engineering costs and may also reduce the time required to implement an integrated circuit design in fully fabricated integrated circuits. Re-using an integrated circuit design generally includes re-using the physical layout for that design. Re-using a physical layout generally means fabricating an integrated circuit in the same process for which it was originally designed, or fabricating it in an alternative process with different electrical characteristics but substantially the same feature sizes.

Unfortunately, the performance of many integrated circuit designs is very sensitive to complex combinations and distributions of variations in the electrical characteristics of transistors resulting from uncontrolled variations in the semiconductor manufacturing process. In some instances these performance sensitivities can result in a circuit that does not meet its specified performance goals. Failure to meet performance goals may result in the binning of parts into lower performance categories, and may even lead to total failure. Such yield losses are of great concern to designers.

BRIEF DESCRIPTION OF THE DRAWINGS

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 1A:
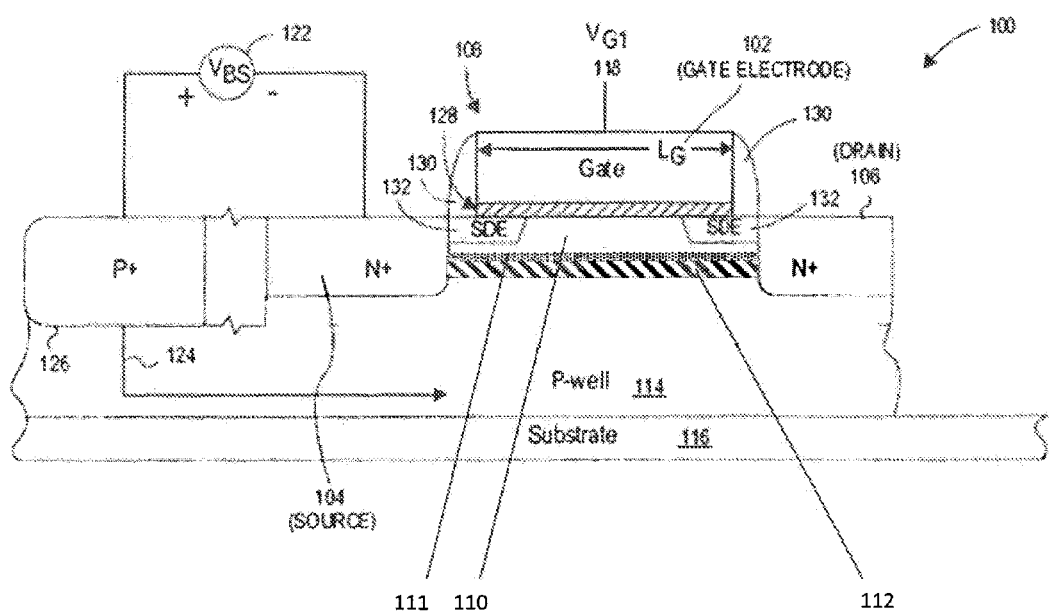
FIG. 1A is a cross-sectional view of an n-channel field effect transistor fabricated in accordance with a Deeply Depleted Channel (DDC) transistor architecture.

It is noted that the cross-sectional representations of various semiconductor structures shown in the figures are not necessarily drawn to scale, but rather, as is the practice in this field, drawn to promote a clear understanding of the structures, process steps, and operations which they are illustrating.

DETAILED DESCRIPTION

The following Detailed Description refers to accompanying drawings to illustrate exemplary embodiments consistent with the invention. References in the Detailed Description to "one exemplary embodiment," "an illustrative embodiment," "an exemplary embodiment," and so on, indicate that the exemplary embodiment described may include a particular feature, structure, or characteristic, but every exemplary or illustrative embodiment may not necessarily include that particular feature, structure, or characteristic. Moreover, such phrases are not necessarily referring to the same exemplary embodiment. Further, when a particular feature, structure, or characteristic is described in connection with an embodiment, it is within the knowledge of those skilled in the relevant art(s) to affect such feature, structure, or characteristic in connection with other embodiments whether or not explicitly described.

The following Detailed Description of the exemplary embodiments will so fully reveal the general nature of the embodiments that others can, by applying knowledge of those skilled in relevant art(s), readily modify and/or adapt for various applications such exemplary embodiments, without undue experimentation. Therefore, such adaptations and modifications are intended to be within the meaning and plurality of equivalents of the exemplary embodiments.

The acronym AVT, as used herein is interchangeable with $\sigma\Delta V_T$.

The acronym CMOS refers to Complementary Metal Oxide Semiconductor. As used in this disclosure CMOS refers to either a circuit that includes both p-channel field effect transistors and n-channel field effect transistors, or a semiconductor manufacturing process that produces both p-channel field effect transistors and n-channel field effect transistors on the same die or on the same substrate.

Epitaxial layer refers to a layer of single crystal semiconductor material. In this field, an epitaxial layer is commonly referred to "epi."

FET, as used herein, refers to field effect transistor. An n-channel FET is referred to herein as an N-FET. A p-channel FET is referred to herein as a P-FET. Unless noted otherwise the FETs referred to herein are MOSFETs.

It is noted that the use of the word "transistor" in this field is context sensitive. That is, depending on the context, it may refer to a physically implemented transistor in an integrated circuit, a simulation model of a transistor, a layout of a transistor, a schematic representation of a transistor, and so on.

As used herein, "gate" refers to the gate terminal of a FET. The gate terminal of a FET is also referred to in this field as a "gate electrode." Historically, the gate electrode was a single structure such as a layer of doped polysilicon disposed on a gate dielectric. More recent gate electrodes have included the use of metals and metal alloys in their structures.

Source/drain (S/D) terminals refer to the terminals of a FET, between which conduction occurs under the influence of an electric field, subsequent to the inversion of the semiconductor surface under the influence of an electric field resulting from a voltage applied to the gate terminal of the FET. Generally, the source and drain terminals of a FET are fabricated such that they are geometrically symmetrical. With geometrically symmetrical source and drain terminals it is common to simply refer to these terminals as source/drain terminals, and this nomenclature is used herein. Designers often designate a particular source/drain terminal to be a "source" or a "drain" on the basis of the voltage to be applied to that terminal when the FET is operated in a circuit.

Substrate, as used herein, refers to the physical object that is the basic workpiece that is transformed by various process operations into the desired microelectronic configuration. Silicon wafers are a commonly used substrate in the manufacture of integrated circuits.

The "active" surface of a substrate refers to the surface in and upon which active circuit elements such as transistors are, or are to be, formed.

The acronym SRAM refers to Static Random Access Memory.

The term "porting" as used herein refers to the methods involved in taking a first integrated circuit design that has been targeted for implementation in a first semiconductor manufacturing process, and implementing a second circuit design in a second semiconductor manufacturing process wherein the electrical performance of the second integrated circuit meets or exceeds the requirements specified for the first integrated circuit design even if the threshold voltage targets of the second integrated circuit design are different from those of the first integrated circuit design; and wherein physical layouts, and in particular the gate-widths and gate-lengths of the transistors, of the first and second integrated circuit designs are the same or substantially the same. Further, in the context of the present disclosure, the second integrated circuit design, when fabricated in the second semiconductor manufacturing process and then operated, experiences less off-state transistor leakage current than does the first integrated circuit design, when fabricated in the first semiconductor manufacturing process, and then operated. Still further, in the context of the present disclosure, the methods involved in porting include determining processing targets for the second semiconductor manufacturing process.

The term "migrating" as used herein is synonymous with porting.

Overview

Recently, processes have been developed, such as the DDC transistor manufacturing processes developed by SuVolta, Inc., of Los Gatos, Calif., which can improve electrical performance without requiring an integrated circuit design to be re-implemented at the smaller dimensions required at other technology nodes. Because electrical improvements can be obtained without having to re-design circuitry and physical layouts for smaller feature sizes, there is significant interest in porting existing integrated circuit designs from a first semiconductor manufacturing process to a second manufacturing process with no, or relatively few, changes to the physical layout.

Put another way, a manufacturing process such as the DDC transistor semiconductor manufacturing process, offers reduced off-state leakage current as compared to designs implemented in conventional semiconductor manufacturing processes at substantially the same feature sizes. Further, a DDC transistor semiconductor manufacturing process can provide this improved electrical performance without requiring the large expense of producing a new mask set. However, in order to make a decision about whether to port an existing design to the alternative manufacturing process, customers desire to evaluate whether the yield to be expected in the new process makes the porting economically feasible. In other words, even if electrical performance is improved, if the yield is too low to profitably produce the product represented by the design, there is very little chance that a customer will agree to use the alternative process.

It is well known in the fields of integrated circuit design and semiconductor manufacturing that each new technology node provides smaller feature sizes for transistors, and usually for other structures such as interconnect as well. Conventionally, improved electrical performance required implementing integrated circuit designs with a more advanced manufacturing processes at a technology node that offered smaller feature sizes. Historically it was possible to "shrink" the physical layout and manufacture this smaller version of the original design in the new process. However, as feature sizes have become smaller, and particularly as minimum transistor dimensions have decreased below 100 nm, the required manufacturing processes and lithography methods have introduced layout constraints to such an extent that a simple linear shrink of a physical layout is very difficult, if not impossible, to use as a means of porting a given integrated circuit design from a first process to a second process that offers improved electrical performance.

As is known in the field of integrated circuit design, the cost of preparing masks and fabricating the integrated circuits is very high. In view of these costs, integrated circuit designers perform extensive simulations of their circuit designs in order to reduce the risk of manufacturing a circuit that does not perform as desired. Such circuit simulations generally rely on four sets of information: (a) a network topology description, (b) circuit element models, (c) process related targets (e.g., transistor threshold voltages), and (d) input waveforms to drive the circuit being simulated.

Both the network topology description and the input waveforms are independent of, or at least substantially decoupled from, the semiconductor manufacturing process with which the circuit is intended to be manufactured. The circuit element models and the process related targets are closely related to this semiconductor manufacturing process.

As noted above, integrated circuit designers seek to reduce static power consumption due to off-state leakage current. But, even in seeking to reduce this parasitic power consumption, circuit designers also desire to re-use their integrated circuit designs. In this context, an integrated circuit design refers to the information describing both a transistor network topology and a corresponding physical layout. It is noted that the aforementioned "transistor network topology" is used broadly herein and may encompass circuit network topologies that include other electrical circuit elements such as resistors, capacitors, diodes, and so on.

In general, a digital integrated circuit design project progresses through a number of well recognized steps. Each step provides some work product that is typically used as an input to the next step. For example, a system level description or system specification may be prepared that describes the functions and features of an integrated circuit. From the system level specification an architectural design for the proposed integrated circuit may be prepared. Next, a functional design and/or logic design is performed. Transistor-level circuit design may be performed subsequent to a logic design. Physical design may involve creating a physical layout of the integrated circuit, or at least portions of the integrated circuit. Various verification processes are performed to ensure that the design will meet its performance specifications. In the case of a digital integrated circuit, for example, simulations and/or static timing analyses are used to ensure that the timing requirements are met; design rule checking is performed to ensure manufacturability of the physical layout; layout versus schematic checking is performed to ensure that the physical layout matches the intended circuit design; and so on. Finally the integrated circuit is fabricated, tested, packaged, and the process is complete.

It is noted that there may be wide latitude in the steps of the circuit design project outlined above. For example, if the integrated circuit design is to be created by using pre-designed standard cells, then the need to perform transistor-level circuit design may be significantly diminished if not eliminated.

Various embodiments provide for transforming transistor parameter targets of a circuit designed for a first semiconductor manufacturing process to transistor parameter targets in a second semiconductor manufacturing process. The transistor parameter targets for the second process provide equal or better electrical performance and/or equal or better yield when the circuit is manufactured using the second process. The transistor parameter targets of the second process are typically, but not necessarily, different from those of the first process.

By way of example and not limitation, FET threshold voltage is a commonly used transistor parameter target. In fact, many semiconductor processes are set up to provide N-FETs selectively targeted to have either low Vt, standard Vt, or high Vt. Such processes also typically provide P-FETs selectively targeted to have either low Vt, standard Vt, or high Vt.

In the case of memory bit cell design, a substantial effort goes into developing and verifying the physical layout of the bit cell. From both cost and time-to-market perspectives, it would be very helpful in the case of a memory bit cell design to be able to port an existing design to a process with improved electrical characteristics. Improvements in electrical characteristics such as leakage current and reduced threshold voltage variation, are particularly desirable.

The DDC transistor architecture, and the semiconductor manufacturing process that produces it, have, among other things, the sought after characteristic of low sub-threshold conduction. This architecture and process are discussed in more detail below.

Since the DDC transistor architecture and manufacturing process provide integrated circuit designers with the electrical characteristics that are desired, but designers are reluctant to invest in a re-design and re-layout of an existing circuit, tools and methods for investigating the yield impact of process changes and demonstrating that an alternative process is suitable not only in terms of reduced off-state leakage current, but also in terms of yield would benefit designers, producers and consumers alike. Such tools and methods are further suited for process target generation.

DDC Transistor Architecture and Manufacturing Process

The structural architecture and illustrative methods of manufacturing DDC transistors are disclosed in great detail in various patents and patent applications assigned to the assignee of this application. Nonetheless, a short description of the DDC structural architecture, methods of manufacturing, and electrical characteristics are provided below.

FIG. 1A shows an embodiment of a Deeply Depleted Channel (DDC) transistor 100 that is formed on a P-type silicon substrate and configured to have an enhanced body coefficient, along with the ability to set threshold voltage Vt with enhanced precision. DDC transistor 100 is an N-FET and includes a gate electrode 102, a first N-type source/drain (S/D) 104, a second N-type SA 106, and a gate dielectric layer 128 disposed over a substantially undoped channel region 110. Lightly doped source/drain extensions (SDE) 132, are disposed, respectively, adjacent to first and second source/drain 104, 106, and extend toward each other thus reducing the effective length of channel region 110.

DDC transistor 100 includes a screening region 112 that is highly doped with P-type dopants, and a Vt set region 111 also including P-type dopants. It will be understood that, with appropriate change to substrate or dopant material, a P-FET DDC transistor can similarly be formed.

In one embodiment, a process for forming the DDC transistor includes forming the screening region 112. In some embodiments, the screening region is formed by implanting dopants into P-well 114. In alternative embodiments the screening region is formed on the P-well using methods such as in-situ doped epitaxial silicon deposition, or epitaxial silicon deposition followed by dopant implantation. The screening region formation step can be before or after shallow trench isolation (STI) formation, depending on the application and results desired. Boron (B), Indium (I), or other P-type materials may be used for P-type implants, and arsenic (As), antimony (Sb) or phosphorous (P) and other N-type materials can be used for N-type implants. In some embodiments, screening region 112 can have a dopant concentration between about $1\times10^{18}$ to $1\times10^{20}$ dopant atoms/cm$^3$, with approximately $5\times10^{19}$ being typical. A germanium (Ge), carbon (C), or other dopant migration resistant layer can be applied above the screening region to reduce upward migration of dopants. The dopant migration resistant layer can be implanted into the screening region or provided as an in-situ doped epitaxial layer.

In some embodiments, a threshold voltage (Vt) set region 111 is disposed above screening region 112, and formed as a thin doped layer. Vt set region 111 can be either adjacent to screening region 112, be within screening region 112, or vertically offset from screening region 112. In some embodiments, Vt set region 111 is formed by delta doping, controlled in-situ deposition, or atomic layer deposition. Vt set region 111 can alternatively be formed by way of an in-situ doped epitaxial layer that is grown above screening region 112, or by epitaxial growth of a thin layer of silicon followed by out-diffusion of dopant atoms from screening region 112. Varying dopant concentration allows for adjustments of threshold voltage value for the transistor. In some embodiments, Vt set region 111 can have a dopant concentration between about $1\times10^{18}$ dopant atoms/cm$^3$ and about $1\times10^{19}$ dopant atoms per cm$^3$. In alternative embodiments, Vt set region 111 can have a dopant concentration that is approximately less than half of the concentration of dopants in screening region 112. Preferably, ion implantation performed to introduce the dopant material into a substrate, but at least some of the doping can be done using in-situ doped epitaxial deposition.

In some embodiments, the formation of Vt set region 111 is followed by a non-selective blanket epi deposition step that forms the substantially undoped channel region 110. Shallow trench isolation (STI) structures can be formed after the non-selective blanket epi deposition step, and can include the formation of a low temperature trench sacrificial oxide liner, at a temperature lower than 900° C.

In addition to using dopant migration resistant layers, other techniques can be used to reduce upward migration of dopants from screening region 112 and Vt set region 111, including but not limited to low temperature processing, selection or substitution of low migration dopants such as antimony or indium, low temperature or flash annealing to reduce interstitial dopant migration, or any other technique to reduce movement of dopant atoms.

Substantially undoped channel region 110 is positioned above Vt set region 111. Preferably, substantially undoped channel region 110 is achieved by way of epitaxial growth of intrinsic semiconductor material without dopant additives to modify the electrical conductivity of the material. The resultant layer typically has a dopant concentration less than $5\times10^{17}$ dopant atoms per cm$^3$. In alternative embodiments, substantially undoped channel region 110 has a dopant concentration that is approximately less than one tenth of the dopant concentration in screening region 112. In one embodiment, the thickness of substantially undoped channel region 110 can range from 5 to 50 nanometers, with exact thickness being dependent upon desired transistor operating characteristics and transistor design node (i.e., a 20 nm gate length transistor will typically have a thinner channel thickness than a 45 nm gate length transistor).

A gate stack may be formed or otherwise constructed above channel region 110 in a number of different ways, from different materials, and of different work functions as is known in this field.

Source 104 and drain 106 can be formed preferably using conventional dopant ion implantation processes and materials, and typically includes source/drain extension regions that define, at least in part, the electrical channel length of the transistor of which they form a part. Channel region 110 contacts and extends between S/D 104 and S/D 106.

In various embodiments of DDC transistor 100, when voltage is applied at gate electrode at a predetermined level, a depletion region formed in channel region 110 can substantially extend to the screening region 112.

Overall improvement of noise and electrical Characteristics for a transistor require careful trade-offs to be made in doping density, length, and depth of the foregoing transistor structures. Improvements made in one area, for example, channel mobility, can be easily offset by adverse short channel effects or greater variability in capacitance or output resistance. One particularly critical parameter for analog and digital transistor design is the threshold voltage at which the transistor switches on or off.

The threshold voltage of DDC transistor 100 can be adjusted by controlling the dopant concentration and position of Vt set region 111, while leaving the bulk of channel region 110 substantially undoped. In a typical DDC process architecture, conventional "channel implants" where the channel is implanted to set threshold voltage, is not used. Preferably, the threshold voltage setting technique of forming halos adjacent to the source/drain is not used, either. Preferably, the threshold voltage of the DDC transistor is set by the design, or selection, of various DDC process variables such as the doping depth, doping profile of the doped region and location and value of the peak concentration to result in a laterally extended, doped region that is embedded a distance away from the gate dielectric layer, preferably separated from the gate dielectric by a distance of at least ⅕ of the gate length (Lg). The DDC transistor doping profiles and dopant concentrations are designed., or selected, to achieve the desired threshold voltage, junction leakage and other parametric values. The design, or selection of the doping profiles and concentrations typical takes into consideration factors such as, but not limited to, the work function of the gate electrode.

As previously noted, screening region 112 is a highly doped layer that typically contains dopant atoms with a concentration of between $1\times10^{18}$ atoms/cm$^3$ and $1\times10^{20}$ atoms/cm$^3$, positioned under channel region 110. P-type dopants such as boron are selected for screening regions of N-FETs, while N-type dopants such as arsenic, antimony or phosphorus can be selected for P-FETs. The presence of a screening region below channel region 110 is necessary to define a depletion zone beneath the gate. Generally, the greater the distance screening region 112 is positioned from gate dielectric 128, the lower the threshold voltage, and conversely, the closer screening region 112 is to gate dielectric 128, the higher the threshold voltage. As shown in FIGS. 1-2, screening region 112 can contact S/D regions, or optionally, it can be positioned at a greater distance below the gate to avoid direct contact with the S/D regions (not shown). In some embodiments, it may be formed as a blanket or sheet extending under multiple source/drain/channel regions, while in other embodiments it may be a self-aligned implant or layer coextensive with channel region 110 or a layer extending between outer edges of gate spacers 130. The screening region thickness can typically range from 5 to 100 nanometers. Screening region 112 is highly doped relative to channel region 110, the threshold voltage set region (if provided), and the well region. The peak dopant concentration of the screening region can be ten times or greater than the dopant concentration of the substantially undoped channel, with a relative concentration that can be between ten to a hundred times the dopant concentration of channel region 110. In practice, screening region 112 can be doped to have a near uniform concentration of between $5 \times 10^{18}$ atoms/cm$^3$ and $5 \times 10^{19}$ atoms/cm$^3$. However, embodiments in which the screening region has complex dopant profile or reduces sharply in concentration from an initial spike are also contemplated. In certain embodiments, dopant migration resistant layers of carbon, germanium, or the like can be applied along with or above screening region to prevent dopant migration into the optional Vt set region and the channel region.

A DDC semiconductor fabrication process typically uses a different process sequence from the conventional CMOS semiconductor fabrication process because it is imperative to control against unwanted migration of dopants from the screen/Vt set region into the channel which must remain substantially undoped. An exemplary process flow for a DDC semiconductor fabrication process is shown in FIG. 1B.

Figure 1B:
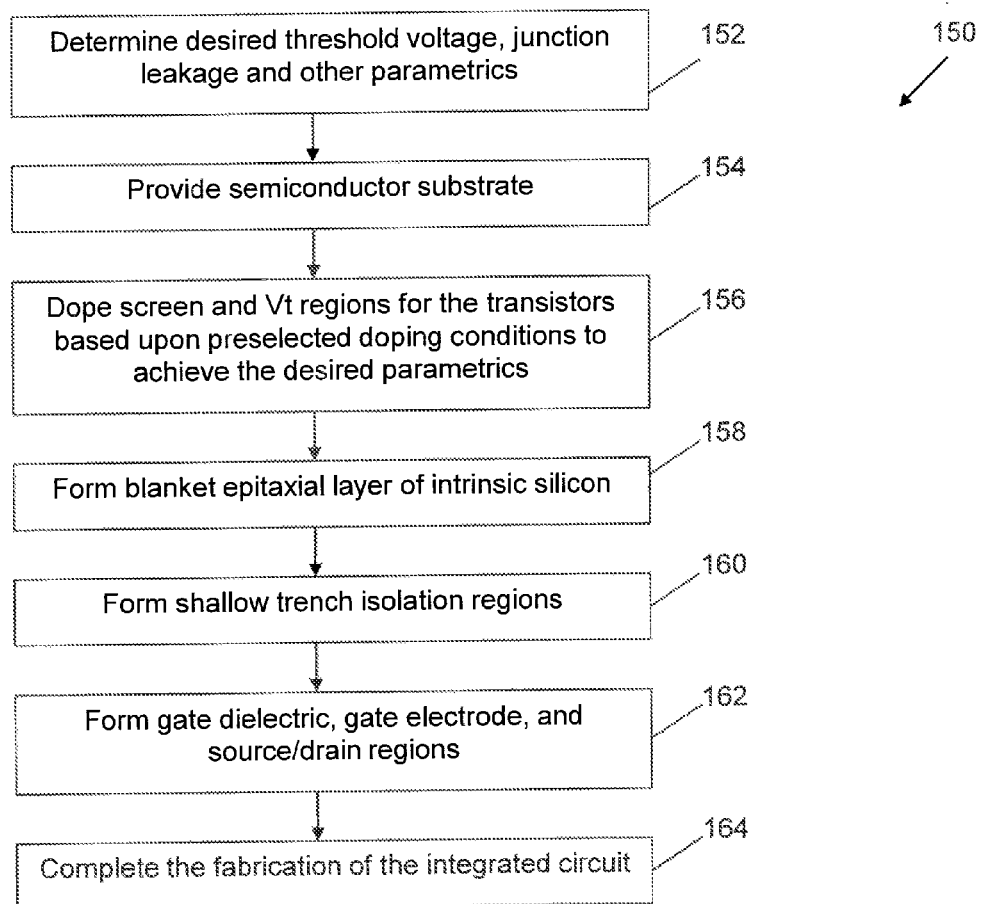
FIG. 1B is a flow diagram of an illustrative process for fabricating a DDC transistor.
Figure 2:
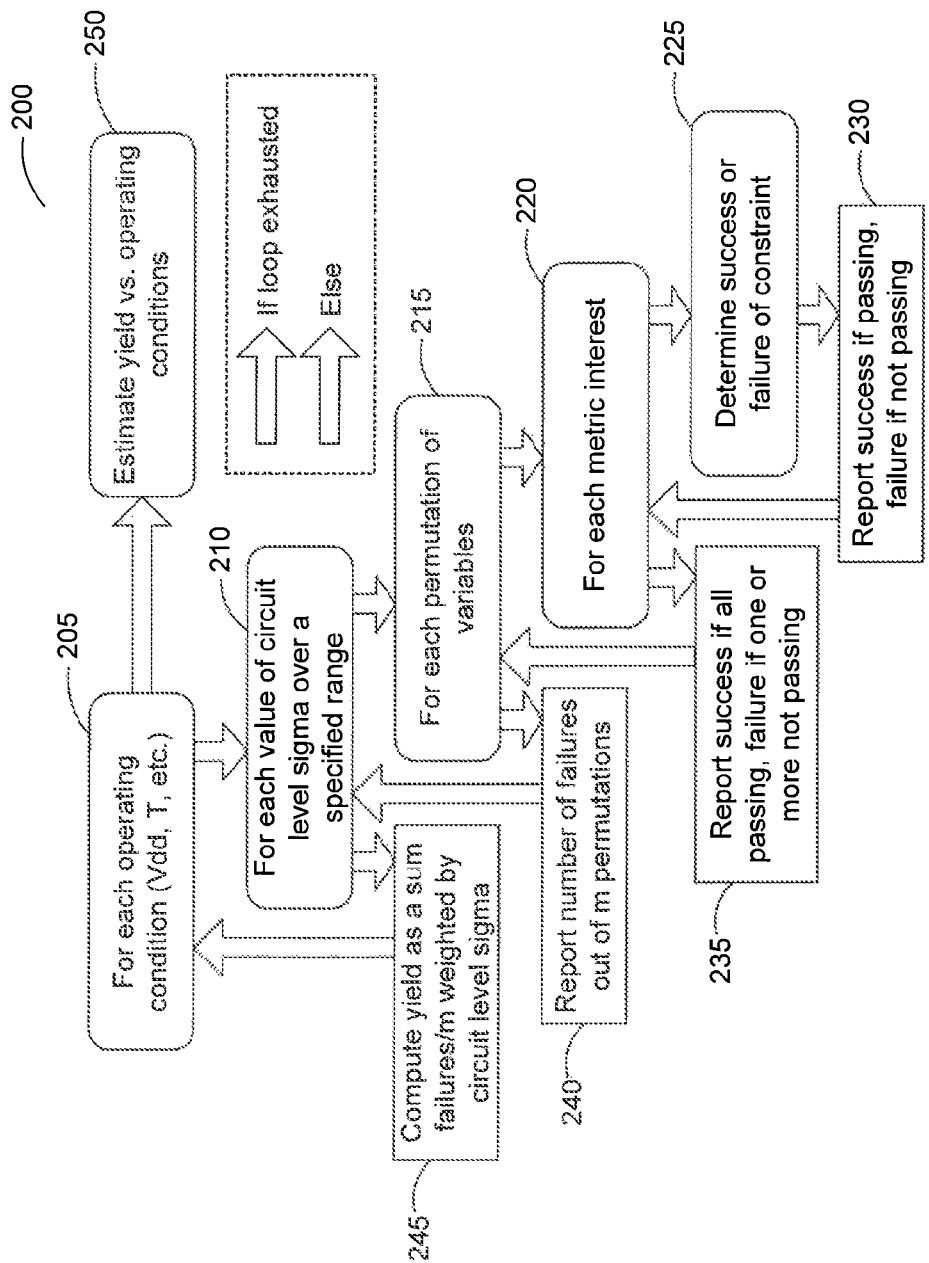
FIG. 2 illustrates a series of nested "for loops" that represent the logic used in various embodiments of the present invention.

Referring to FIG. 1B, an illustrative process 150 for fabricating integrated circuits that include one or more DDC transistors is shown. In a step 152, the desired transistor threshold voltage, junction leakage, and other transistor parametrics are determined. In a step 154, a semiconductor wafer is provided. In this illustrative embodiment, the semiconductor substrate is a bulk silicon wafer. In a step 156, doping operations are performed to dope the screen region and the Vt set region of each DDC transistor. The doping profiles, concentrations, and dopant conductivity types are preselected based, at least in part, on the doping conditions needed to achieve the desired parametrics. It is noted that there may be more than one set of doping profiles, concentrations, and dopant conductivity types that can produce the desired set electrical characteristics in a fabricated DDC transistor. In a step 158, a blanket epitaxial layer is formed on the active-side surface of the substrate. In this illustrative embodiment, the epitaxial layer is an intrinsic silicon. In a step 160, shallow trench isolation regions are formed on the active-side surface of the substrate. In a step 162, a gate dielectric layer and a gate electrode layer are formed and patterned; and S/D regions are formed in the substrate adjacent to the patterned gate electrodes. It is noted that the gate dielectric layer may be a stack that includes two or more materials. It is further noted that the gate electrode may be formed of a single layer of material or may be formed of a stack of materials. It is still further noted that the gate electrode may be removed and replaced subsequent to the formation of the S/D regions. In a step 164, the fabrication of integrated circuits is completed. As will be appreciated by those skilled in the art and having the benefit of this disclosure, various conventional processing operations, including but not limited to forming and patterning interconnect layers and vias may be performed to complete the integrated circuits.

It is noted that the DDC semiconductor fabrication process can be adapted to fabricate a combination of DDC transistors and non-DDC transistors. For instance, if non-DDC transistors of conventional planar type are to be fabricated, then the process described above in connection with FIG. 1B can be modified to accommodate the fabrication steps for conventional planar type transistors.

Figure 1C:
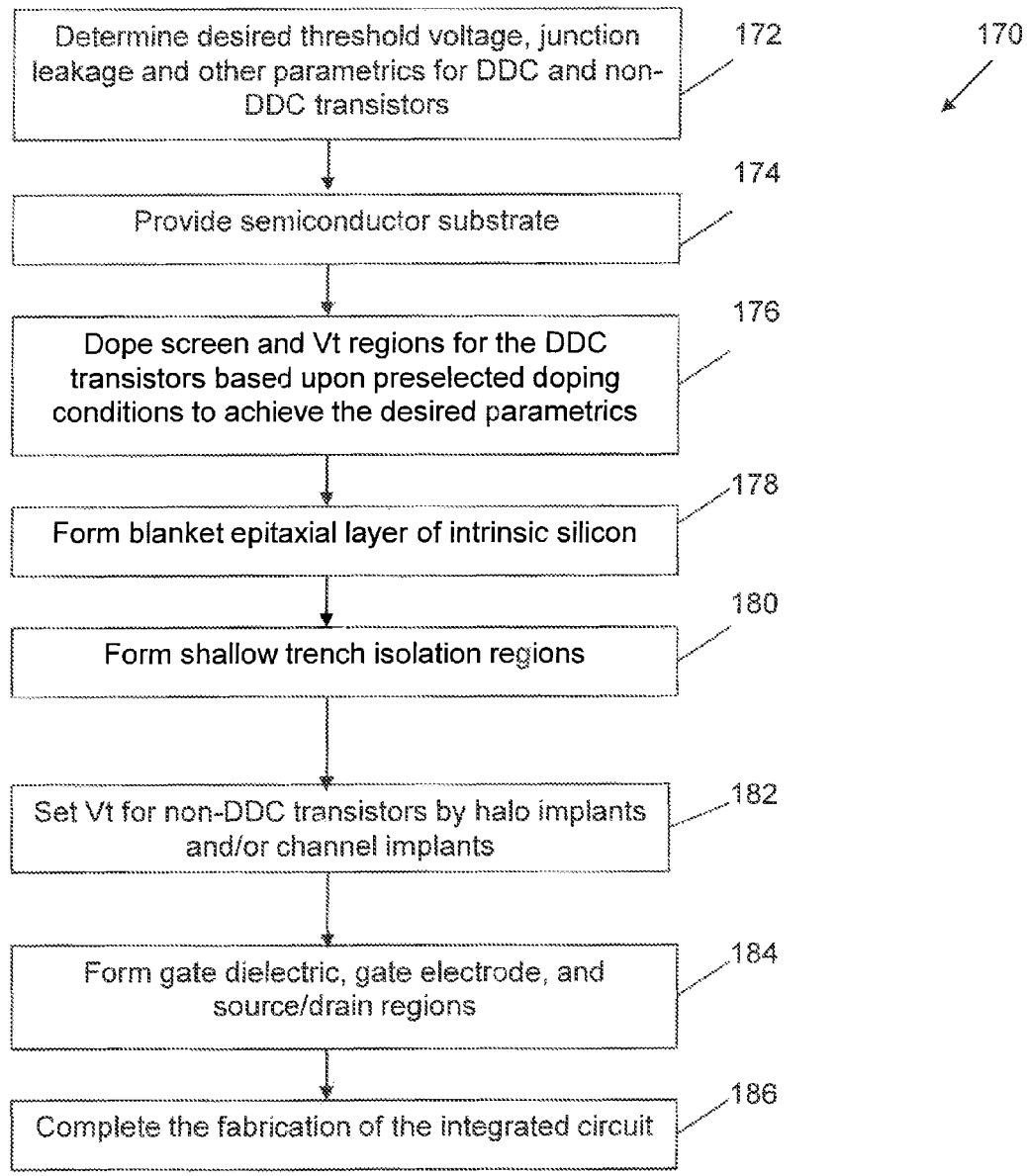
FIG. 1C is a flow diagram of an illustrative process for fabricating DDC and non-DDC transistors.

Referring to FIG. 1C, an illustrative process 170 for fabricating integrated circuits that include one or more DDC transistors together with one or more non-DDC transistor is shown. In a step 172, the desired transistor threshold voltage, junction leakage, and other transistor parametrics for DDC and non-DDC transistors are determined. In a step 174, a semiconductor wafer is provided. In this illustrative embodiment, the semiconductor substrate is a bulk silicon wafer. In a step 176, doping operations are performed to dope the screen region and the Vt set region of each DDC transistor. The doping profiles, concentrations, and dopant conductivity types are preselected based, at least in part, on the doping conditions needed to achieve the desired parametrics. It is noted that there may be more than one set of doping profiles, concentrations, and dopant conductivity types that can produce the desired set electrical characteristics in a fabricated DDC transistor. In a step 178, a blanket epitaxial layer is formed on the active-side surface of the substrate. In this illustrative embodiment, the epitaxial layer is an intrinsic silicon. In a step 180, shallow trench isolation regions are formed on the active-side surface of the substrate. In a step 182, the threshold voltages for non-DDC transistors are set by halo and/or channel implants. In a step 184, a gate dielectric layer and a gate electrode layer are formed and patterned; and S/D regions are formed in the substrate adjacent to the patterned gate electrodes. It is noted that the gate dielectric layer may be a stack that includes two or more materials. It is further noted that the gate electrode may be formed of a single layer of material or may be formed of a stack of materials. It is still further noted that the gate electrode may be removed and replaced subsequent to the formation of the S/D regions. In a step 186, the fabrication of integrated circuits is completed. As will be appreciated by those skilled in the art and having the benefit of this disclosure, various conventional processing operations, including but not limited to forming and patterning interconnect layers and vias may be performed to complete the integrated circuits.

It is noted that applying bias to screening region 112 is another technique for modifying Vt of DDC 100. Screening region 112 sets the body effect for the transistor and allows for a higher body effect than is found in conventional FET technologies. For example, a body tap 126 to screening region 112 of DDC transistor 100 can be formed in order to provide further control of threshold voltage. The applied bias can be either reverse or forward biased, and can result in significant changes to threshold voltage. Bias can be static or dynamic, and can be applied to isolated transistors, or to groups of transistors that share a common well. Biasing can be static to set threshold voltage at a fixed set point, or dynamic, to adjust to changes in transistor operating conditions or requirements.

Yield-Aware Semiconductor Manufacturing Process Target Generation

A device design has characteristics that are tied to the semiconductor manufacturing process such as, among other things, junction leakage, Ion/Ioff, DIBL (drain induced barrier lowering), Vt rolloff, Vt set range and Vt variability. The device characteristics in turn can determine the minimum supply voltage, reliability and other parameters specific to the circuit designs using the devices. At the bit cell level, the speed, power and yield are influenced by the device characteristics but compensatory design changes can be made to overcome limitations otherwise in the devices. For instance, critical dimension can be enlarged at a bit cell level to allow for increased threshold voltage, decreased junction leakage, and so on. The choice of what device design to use in a given bit cell should not be made solely on device-specific considerations. How the device can serve the bit cell design including the extent of the need to redesign the bit cell, should be comprehended. Preferably, the need to redesign should be kept to a minimum. If a better device could be inserted into the otherwise same bit cell design for better performance and power, the better device would be selected. Or, by using the better device, better value in the bit cell could be achieved by shrinking the footprint of the bit cell, enabled because of the better device. A method by which to evaluate a bit cell in the context of a device having specific device characteristics is highly desired. Such a method could lead to the ability to predict yields that could be achieved, which in turn can result in the implementation of the semiconductor process to churn out improved integrated circuits.

Basically, a transistor may have positive variation, no variation, or negative variation (3 possible states). The transistor variations, when combined and having the appropriate magnitude (as described below), provide a total variation at the circuit level at one sigma. Thus, the values may be multiplied by a desired circuit sigma to provide a specific transistor sigma for each case in a simulation-based experiment. The number of permutations m required for a predetermined circuit can be related to the number of variables k according to the following equation:

$$m = \sum_{i=0}^{k} \binom{k}{i} 2^i \quad \text{Equation (1)}$$

Equation 1 assumes (through i=0 summation start) that the 0 sigma point is included.

For sigma points that are subsequent to an initial run, e.g., from 2 sigma to 3 sigma, the summation begins with i=1. A quantity σ represents the total range of variation of a given variable (e.g., transistor Vt or total transistor variation) in a permutation. If the parametric variation of one parameter of a transistor device is considered to be one variable, then each permutation includes a parametric variation of each transistor in the predetermined circuit. If only one variable is subject to discrete variation, the range of variation of that variable is +/−σ. If two variables are subject to discrete variation, each variable can be represented as varying within the same range, making the range of variation for each variable $\sigma/(2^{0.5})$. Similarly, for three variables subject to equal discrete variation, the range of discrete variation for each variable is $\sigma/(3^{0.5})$, and for four variables subject to equal variation, the range of discrete variation for each variable is $\sigma/(4^{0.5})$. Thus, those skilled in statistics will recognize that the transistor level variations are treated as independent in their circuit level variation effect. In general if the predetermined circuit has n variables that are subject to variation, and each variable varies within the same range, the range of discrete variation for each variable x (where x is the transistor level sigma, and σ is the circuit level sigma) is provided by the following equation:

$$x = \sigma/(n^{0.5}). \quad (2)$$

For example, for a 2-input NAND gate having two P-FETs and two N-FETs, if the parametric variation being considered is threshold voltage variation, then the NAND gate has four variables that can vary (the four transistors), and therefore, in accordance with equation (1) m=80, i.e., there are 80 unique permutations of the variables for the NAND gate that result in a discrete circuit level variation σ. These permutations are enumerated in Table 1 below, where k1, k2, k3, and k4 correspond to each of the four variables:

TABLE 1

| Permutation | k1 | k2 | k3 | k4 |
|---|---|---|---|---|
| 1 | +σ | 0 | 0 | 0 |
| 2 | −σ | 0 | 0 | 0 |
| 3 | 0 | +σ | 0 | 0 |
| 4 | 0 | −σ | 0 | 0 |
| 5 | 0 | 0 | +σ | 0 |
| 6 | 0 | 0 | −σ | 0 |
| 7 | 0 | 0 | 0 | +σ |
| 8 | 0 | 0 | 0 | −σ |
| 9 | $+\sigma/(2^{0.5})$ | $+\sigma/(2^{0.5})$ | 0 | 0 |
| 10 | $+\sigma/(2^{0.5})$ | $-\sigma/(2^{0.5})$ | 0 | 0 |
| 11 | $-\sigma/(2^{0.5})$ | $+\sigma/(2^{0.5})$ | 0 | 0 |
| 12 | $-\sigma/(2^{0.5})$ | $-\sigma/(2^{0.5})$ | 0 | 0 |
| 13 | $+\sigma/(2^{0.5})$ | 0 | $+\sigma/(2^{0.5})$ | 0 |
| 14 | $+\sigma/(2^{0.5})$ | 0 | $-\sigma/(2^{0.5})$ | 0 |
| 15 | $-\sigma/(2^{0.5})$ | 0 | $+\sigma/(2^{0.5})$ | 0 |
| 16 | $-\sigma/(2^{0.5})$ | 0 | $-\sigma/(2^{0.5})$ | 0 |
| 17 | $+\sigma/(2^{0.5})$ | 0 | 0 | $+\sigma/(2^{0.5})$ |
| 18 | $+\sigma/(2^{0.5})$ | 0 | 0 | $-\sigma/(2^{0.5})$ |
| 19 | $-\sigma/(2^{0.5})$ | 0 | 0 | $+\sigma/(2^{0.5})$ |
| 20 | $-\sigma/(2^{0.5})$ | 0 | 0 | $-\sigma/(2^{0.5})$ |
| 21 | 0 | $+\sigma/(2^{0.5})$ | $+\sigma/(2^{0.5})$ | 0 |
| 22 | 0 | $+\sigma/(2^{0.5})$ | $-\sigma/(2^{0.5})$ | 0 |
| 23 | 0 | $-\sigma/(2^{0.5})$ | $+\sigma/(2^{0.5})$ | 0 |
| 24 | 0 | $-\sigma/(2^{0.5})$ | $-\sigma/(2^{0.5})$ | 0 |
| 25 | 0 | $+\sigma/(2^{0.5})$ | 0 | $+\sigma/(2^{0.5})$ |
| 26 | 0 | $+\sigma/(2^{0.5})$ | 0 | $-\sigma/(2^{0.5})$ |
| 27 | 0 | $-\sigma/(2^{0.5})$ | 0 | $+\sigma/(2^{0.5})$ |
| 28 | 0 | $-\sigma/(2^{0.5})$ | 0 | $-\sigma/(2^{0.5})$ |
| 29 | 0 | 0 | $+\sigma/(2^{0.5})$ | $+\sigma/(2^{0.5})$ |
| 30 | 0 | 0 | $+\sigma/(2^{0.5})$ | $-\sigma/(2^{0.5})$ |
| 31 | 0 | 0 | $-\sigma/(2^{0.5})$ | $+\sigma/(2^{0.5})$ |
| 32 | 0 | 0 | $-\sigma/(2^{0.5})$ | $-\sigma/(2^{0.5})$ |
| 33 | $+\sigma/(3^{0.5})$ | $+\sigma/(3^{0.5})$ | $+\sigma/(3^{0.5})$ | 0 |
| 34 | $+\sigma/(3^{0.5})$ | $+\sigma/(3^{0.5})$ | $-\sigma/(3^{0.5})$ | 0 |
| 35 | $+\sigma/(3^{0.5})$ | $-\sigma/(3^{0.5})$ | $+\sigma/(3^{0.5})$ | 0 |
| 36 | $+\sigma/(3^{0.5})$ | $-\sigma/(3^{0.5})$ | $-\sigma/(3^{0.5})$ | 0 |
| 37 | $-\sigma/(3^{0.5})$ | $+\sigma/(3^{0.5})$ | $+\sigma/(3^{0.5})$ | 0 |
| 38 | $-\sigma/(3^{0.5})$ | $+\sigma/(3^{0.5})$ | $-\sigma/(3^{0.5})$ | 0 |
| 39 | $-\sigma/(3^{0.5})$ | $-\sigma/(3^{0.5})$ | $+\sigma/(3^{0.5})$ | 0 |
| 40 | $-\sigma/(3^{0.5})$ | $-\sigma/(3^{0.5})$ | $-\sigma/(3^{0.5})$ | 0 |
| 41 | $+\sigma/(3^{0.5})$ | $+\sigma/(3^{0.5})$ | 0 | $+\sigma/(3^{0.5})$ |
| 42 | $+\sigma/(3^{0.5})$ | $+\sigma/(3^{0.5})$ | 0 | $-\sigma/(3^{0.5})$ |
| 43 | $+\sigma/(3^{0.5})$ | $-\sigma/(3^{0.5})$ | 0 | $+\sigma/(3^{0.5})$ |
| 44 | $+\sigma/(3^{0.5})$ | $-\sigma/(3^{0.5})$ | 0 | $-\sigma/(3^{0.5})$ |
| 45 | $-\sigma/(3^{0.5})$ | $+\sigma/(3^{0.5})$ | 0 | $+\sigma/(3^{0.5})$ |
| 46 | $-\sigma/(3^{0.5})$ | $+\sigma/(3^{0.5})$ | 0 | $-\sigma/(3^{0.5})$ |
| 47 | $-\sigma/(3^{0.5})$ | $-\sigma/(3^{0.5})$ | 0 | $+\sigma/(3^{0.5})$ |
| 48 | $-\sigma/(3^{0.5})$ | $-\sigma/(3^{0.5})$ | 0 | $-\sigma/(3^{0.5})$ |
| 49 | $+\sigma/(3^{0.5})$ | 0 | $+\sigma/(3^{0.5})$ | $+\sigma/(3^{0.5})$ |
| 50 | $+\sigma/(3^{0.5})$ | 0 | $+\sigma/(3^{0.5})$ | $-\sigma/(3^{0.5})$ |
| 51 | $+\sigma/(3^{0.5})$ | 0 | $-\sigma/(3^{0.5})$ | $+\sigma/(3^{0.5})$ |
| 52 | $+\sigma/(3^{0.5})$ | 0 | $-\sigma/(3^{0.5})$ | $-\sigma/(3^{0.5})$ |
| 53 | $-\sigma/(3^{0.5})$ | 0 | $+\sigma/(3^{0.5})$ | $+\sigma/(3^{0.5})$ |
| 54 | $-\sigma/(3^{0.5})$ | 0 | $+\sigma/(3^{0.5})$ | $-\sigma/(3^{0.5})$ |
| 55 | $-\sigma/(3^{0.5})$ | 0 | $-\sigma/(3^{0.5})$ | $+\sigma/(3^{0.5})$ |
| 56 | $-\sigma/(3^{0.5})$ | 0 | $-\sigma/(3^{0.5})$ | $-\sigma/(3^{0.5})$ |
| 57 | 0 | $+\sigma/(3^{0.5})$ | $+\sigma/(3^{0.5})$ | $+\sigma/(3^{0.5})$ |
| 58 | 0 | $+\sigma/(3^{0.5})$ | $+\sigma/(3^{0.5})$ | $-\sigma/(3^{0.5})$ |
| 59 | 0 | $+\sigma/(3^{0.5})$ | $-\sigma/(3^{0.5})$ | $+\sigma/(3^{0.5})$ |
| 60 | 0 | $+\sigma/(3^{0.5})$ | $-\sigma/(3^{0.5})$ | $-\sigma/(3^{0.5})$ |
| 61 | 0 | $-\sigma/(3^{0.5})$ | $+\sigma/(3^{0.5})$ | $+\sigma/(3^{0.5})$ |
| 62 | 0 | $-\sigma/(3^{0.5})$ | $+\sigma/(3^{0.5})$ | $-\sigma/(3^{0.5})$ |
| 63 | 0 | $-\sigma/(3^{0.5})$ | $-\sigma/(3^{0.5})$ | $+\sigma/(3^{0.5})$ |
| 64 | 0 | $-\sigma/(3^{0.5})$ | $-\sigma/(3^{0.5})$ | $-\sigma/(3^{0.5})$ |
| 65 | $+\sigma/(4^{0.5})$ | $+\sigma/(4^{0.5})$ | $+\sigma/(4^{0.5})$ | $+\sigma/(4^{0.5})$ |
| 66 | $+\sigma/(4^{0.5})$ | $+\sigma/(4^{0.5})$ | $+\sigma/(4^{0.5})$ | $-\sigma/(4^{0.5})$ |
| 67 | $+\sigma/(4^{0.5})$ | $+\sigma/(4^{0.5})$ | $-\sigma/(4^{0.5})$ | $+\sigma/(4^{0.5})$ |
| 68 | $+\sigma/(4^{0.5})$ | $+\sigma/(4^{0.5})$ | $-\sigma/(4^{0.5})$ | $-\sigma/(4^{0.5})$ |
| 69 | $+\sigma/(4^{0.5})$ | $-\sigma/(4^{0.5})$ | $+\sigma/(4^{0.5})$ | $+\sigma/(4^{0.5})$ |
| 70 | $+\sigma/(4^{0.5})$ | $-\sigma/(4^{0.5})$ | $+\sigma/(4^{0.5})$ | $-\sigma/(4^{0.5})$ |
| 71 | $+\sigma/(4^{0.5})$ | $-\sigma/(4^{0.5})$ | $-\sigma/(4^{0.5})$ | $+\sigma/(4^{0.5})$ |
| 72 | $+\sigma/(4^{0.5})$ | $-\sigma/(4^{0.5})$ | $-\sigma/(4^{0.5})$ | $-\sigma/(4^{0.5})$ |
| 73 | $-\sigma/(4^{0.5})$ | $+\sigma/(4^{0.5})$ | $+\sigma/(4^{0.5})$ | $+\sigma/(4^{0.5})$ |

TABLE 1-continued

| Permutation | k1 | k2 | k3 | k4 |
|---|---|---|---|---|
| 74 | $-\sigma/(4^{0.5})$ | $+\sigma/(4^{0.5})$ | $+\sigma/(4^{0.5})$ | $-\sigma/(4^{0.5})$ |
| 75 | $-\sigma/(4^{0.5})$ | $+\sigma/(4^{0.5})$ | $-\sigma/(4^{0.5})$ | $+\sigma/(4^{0.5})$ |
| 76 | $-\sigma/(4^{0.5})$ | $+\sigma/(4^{0.5})$ | $-\sigma/(4^{0.5})$ | $-\sigma/(4^{0.5})$ |
| 77 | $-\sigma/(4^{0.5})$ | $-\sigma/(4^{0.5})$ | $+\sigma/(4^{0.5})$ | $+\sigma/(4^{0.5})$ |
| 78 | $-\sigma/(4^{0.5})$ | $-\sigma/(4^{0.5})$ | $+\sigma/(4^{0.5})$ | $-\sigma/(4^{0.5})$ |
| 79 | $-\sigma/(4^{0.5})$ | $-\sigma/(4^{0.5})$ | $-\sigma/(4^{0.5})$ | $+\sigma/(4^{0.5})$ |
| 80 | $-\sigma/(4^{0.5})$ | $-\sigma/(4^{0.5})$ | $-\sigma/(4^{0.5})$ | $-\sigma/(4^{0.5})$ |

Table 1 thus provides a zero-case included design of experiments (DOE) full factorial matrix for the transistor level sigma (x in Eq. (1) above) to be used. The zero case is included here because it allows that the circuit may not be sensitive to small variations in some devices for specific behaviors, and this may not be known a-priori. Note that the zero variation case is only used for the circuit level sigma case encompassing that unique point.

In one embodiment, where the predetermined circuit is a six transistor SRAM cell having two P-FETs and four N-FETs, if the parametric variation being considered is the threshold voltage variation of each transistor, then the SRAM cell has six variables. Therefore, in accordance with Equation (1), there are 728 possible permutations of these variables that result in a variation σ for the SRAM cell with the summation starting at i=1 (729 with start at i=0). More simply, there are 3 states, so the number of cases is $3^k-1$, i.e., 80 for 4 transistors, 243 for 5 transistors, and 728 for 6 transistors, etc. While this number grows quickly, it is far less than is required for a high resolution (statistically accurate) result using Monte Carlo methods. In addition, the range of variation of the threshold voltage for each of these permutations can be σ, $\sigma/(2^{0.5})$, $\sigma/(3^{0.5})$, $\sigma/(4^{0.5})$, $\sigma/(5^{0.5})$, or $\sigma/(6^{0.5})$ respectively, depending on whether the permutation has one, two, three, four, five, or six variables subject to variation, where each variable varies within the same range. In an alternative embodiment of the method for the six transistor SRAM cell, if the parametric variations being considered are the width and Length of the transistors of the SRAM cell, the SRAM cell has twelve variables (i.e., six variables for the width, and six variables for the length of each transistor, respectively). The number of permutations for this embodiment can be calculated from Equation (1), and the range of variation for each variable can be calculated from Equation (2). The DOE full factorial can thus replace a portion of the simulation points that would be provided randomly via Monte Carlo methods, at greater computational efficiency.

A table as set forth above can be generated for transistor permutations related to the devices in a given cell, for instance, in the case of SRAM, read static noise margin, write margin, read current, write speed and leakage power based on known device characteristics such as Vt, can be calculated. Then, the data can be examined to determine the number of faults. A failure rate can be generated for a given σ, from which the overall failure rate for an array can be derived by adding individual failures for individual cells. The inverse of the failure rate provides the yield. Thereby, the yield for a given bit cell constraint (such as supply voltage) can be determined. A table as set forth above can be generated for other types of circuits, for instance, an eight or ten-transistor SRAM, other type of memory, analog circuits and digital logic circuits.

FIG. 2 illustrates one embodiment of a method 200 for estimating the yield for a predetermined circuit. Method 200 can be used to estimate the yield of the predetermined circuit as a result of parametric variations of the transistors in the predetermined circuit at known circuit level variation magnitude (circuit level sigma). Such parametric variations can include variations of the threshold voltage, width, length, and any other parametric variations that can impact the yield of the predetermined circuit. Preferably, circuit-level variation segment (circuit level sigma) values that are chosen to be on the tail of the circuit behavior Gaussian distribution, beyond 2 or 3 sigma, and may take samplings spanning 2 to 8 (circuit level) sigma segments. Note that the overall circuit response need not be Gaussian. By subdividing the probability distribution tail of the circuit behavior distribution via such "strata" of circuit level sigma values, a stratified sampling may be obtained, allowing the determination of low likelihood variations of the sort that are important to semiconductor chip yield, where many such elements, e.g., 64 M-bits, must be functional to yield. Failures must be minimal out to eight sigma to ensure yield in 64 M-bit SRAM arrays. Thus, by varying the global sigma from low to high values, the ultimate circuit yield can be estimated as in FIG. 3. This yield is related exponentially to the number of failing devices vs. the total number of devices by $Y=e^{-AD}$, where Y is the yield, A is the area and D is the defect density. For the purposes of an SRAM analysis, A×D is the probability of a failure in an array of a given size. Consequently, by varying Vdd in step 205, Vmin, Vretain, etc., may be obtained. It should be noted that the subdivisions can have fine granularity, e.g., circuit level sigma at one step is 6.3, next step is circuit level sigma=6.4 (0.1 circuit level sigma granularity) as the yield decrease can be steep as a parameter starts causing circuits to fail the pass/fail criterion. Moreover, the steps through the circuit level sigma, generally starting at a low circuit level sigma and progressing through larger circuit level sigma values at each parameter (e.g., Vdd) value, may be terminated early to further save computational resources and time. Method 200 can therefore estimate the yield of a circuit for one or more operating conditions, e.g., power supply voltage, temperature, bias voltage applied to the screening region of the DDC transistor, body bias voltage applied to the body of a conventional transistor, and any other operating conditions that can have an impact on the yield of the circuit. For each of the operating conditions, method 200 estimates the yield for a predetermined range of the operating condition.

Referring to FIG. 2, in step 205, a for loop initializes by generating tables of DOE factorial permutations for each global sigma value of interest. Then, the for loop iteratively performs evaluation step 210 for a predetermined range of values for each operating condition of interest. When the for loop of step 205 has completed all the evaluations for each circuit level sigma for each of the operating conditions of interest, step 250 is executed which provides an estimated yield as a function of the operating conditions of interest. In step 210, a for loop iteratively performs step 215 for each value of global sigma over a predetermined range, where global sigma characterizes the variation of the predetermined circuit in a specific operating distribution resulting from the parametric variation of the transistors that are part of the predetermined circuit. In one embodiment, the for loop of step 210 iterates over a predetermined global sigma for one parametric variation, such as the variation of the threshold voltage of the transistors in the predetermined circuit. In alternative embodiments, the for loop of step 210 can iterate over a predetermined global sigma for a set of parametric variation, such as the variations of the width and length of the transistors in the predetermined circuit. When the for loop in step 210 has completed the iterations for each selected value of global sigma, step 245 is executed, which computes the estimated yield and returns control to step 205. It should be recognized that other embodiments may alter the loop nesting without changing the overall function of the method.

In step 215, a for loop iteratively performs step 220 for each permutation of variables, where the parametric variation of one parameter of a transistor in the predetermined circuit is considered to be one variable. For example, if the predetermined circuit has four transistors (e.g., a 2-input NAND gate having two P-FETs and two N-FETs), and if the parametric variation being considered is the threshold voltage variation, then the predetermined circuit has four variables (i.e., the threshold voltage variation for each of the four transistors), and the for loop of step 215 performs step 220 for each metric of interest for each permutation of the four variables.

When the for loop in step 215 has completed the iterations for each permutation of variables, step 240 is executed, which reports the number of failures for the m permutations analyzed in step 215.

In step 220, a for loop iteratively performs step 225 for each metric of interest that is being evaluated to estimate the yield of the predetermined circuit. When the for loop in step 220 has completed the evaluation of each metric of interest, step 235 is executed, which reports success (i.e., a PASS condition for the predetermined circuit) if all the evaluated metrics satisfy corresponding passing criterion associated with the evaluated metric, and reports failure (i.e., a FAIL condition for the predetermined circuit) if one or more of the evaluated metrics do not satisfy the corresponding passing criterion associated with the evaluated metric. In step 225, the predetermined circuit is simulated to determine the value of each evaluated metric. Step 230 compares the value of each evaluated metric against the corresponding passing criterion associated with the evaluated metric, and reports success to step 220 if the evaluated metric satisfies the corresponding passing criterion. Alternatively, step 230 reports failure to step 220, if the evaluated metric does not satisfy the corresponding passing criterion associated with the evaluated metric of interest.

To estimate the yield of the predetermined circuit in accordance with method 200, one or more evaluated metrics are specified for the predetermined circuit, and a predetermined passing criterion is specified for each evaluated metric. In one embodiment, where method 200 is used to estimate the yield of a NAND gate, the evaluated metrics can be one or more metrics selected from (i) rise propagation delay, (ii) fall propagation delay, (iii) rise slew delay, (iv) fall slew delay, (v) switching power, and (vi) leakage power. In an alternative embodiment, where method 200 is used to estimate the yield of an SRAM cell, the evaluated metrics can be one or more metrics selected from (i) read static noise margin, (ii) write margin, (iii) read current, (iv) write delay, (v) leakage power, (vi) standby state leakage power, and (vii) standby state minimum retention voltage (Vretain). In general, Vmin indicates the lowest read/write stable voltage for an SRAM array, while Vretain indicates the hold (static) margin minimum voltage, i.e., when the array is merely retaining state. The Vretain is thus in general lower than Vmin. As is known to skilled designers, $V_T$ or device size optimizations that favor one may not favor the other being minimized. For each metric, the associated passing criteria are specified in order to determine PASS/FAIL conditions of the predetermined circuit for each evaluated metric. For example, in method 200 to estimate the yield of a NAND gate, the evaluated metrics can be rise and fall propagation delays, active power and leakage power dissipation, and the associated pass/fail conditions can be defined such that the value of each of these metrics is less than a predetermined value (such as rise propagation delay less than 100 ps, and leakage power less than 1 nW, etc.). In one embodiment, the pass/fail criteria associated with each evaluated metric can be fixed, such that the same criteria is used for each of the operating conditions being analyzed in step 205. In alternative embodiments, the pass/fail criteria associated with each evaluated metric can vary as a function of the value of the operating conditions being analyzed in step 205, such that the pass/fail criteria is different for different values of one or more of the operating conditions in step 205.

In one embodiment, method 200 simulates all m permutations (in accordance with Equations (1) and (2) above) of the variables in the circuit and for each permutation, determines which of the points pass and which do not. All evaluation metrics of interest are computed for each permutation; a permutation that fails one or more pass/fail points is regarded as a failure, while a permutation that passes all pass/fail points is regarded as a success. Pass/fail criteria may be altered in subsequent usages of the method to determine some circuit behavior characteristics, e.g., Vmin over Vretain. In one embodiment, method 200 performs the computations for several values of global sigma within a range, ideally starting with a value of global sigma just before failures first appear and ending with a value of global sigma where additional failures are no longer substantial in determining yield. This ending value of global sigma will vary depending on the circuit being analyzed. For example, the SRAM cell may require analysis up to 8 global sigma or more, as an integrated circuit can contain millions of memory cells. In an alternative example, a flip-flop may only require analysis up to 4 global sigma since a target integrated circuit can contain only a few thousand sequential elements. In one embodiment of method 200, the values of global sigma are uniformly spaced within the range of values for which the computations are performed. In one embodiment of method 200, the values of global sigma are not uniformly spaced with the range of values for which the computations are performed. In alternative embodiments of method 200, the values of σ are more widely spaced for lower values of circuit level sigma and the values of circuit level sigma are more narrowly spaced for higher values of circuit level sigma. In certain embodiments of method 200, the values of circuit level sigma are adaptively spaced such that a narrower spacing is used for values of global sigma that have more failures and a wider spacing is used for values of global sigma that have fewer (or no) failures. For instance, if there are no failures at circuit level sigma=3, then smaller values may be skipped (those same factorial points with less variation will obviously pass).

Figure 3A:
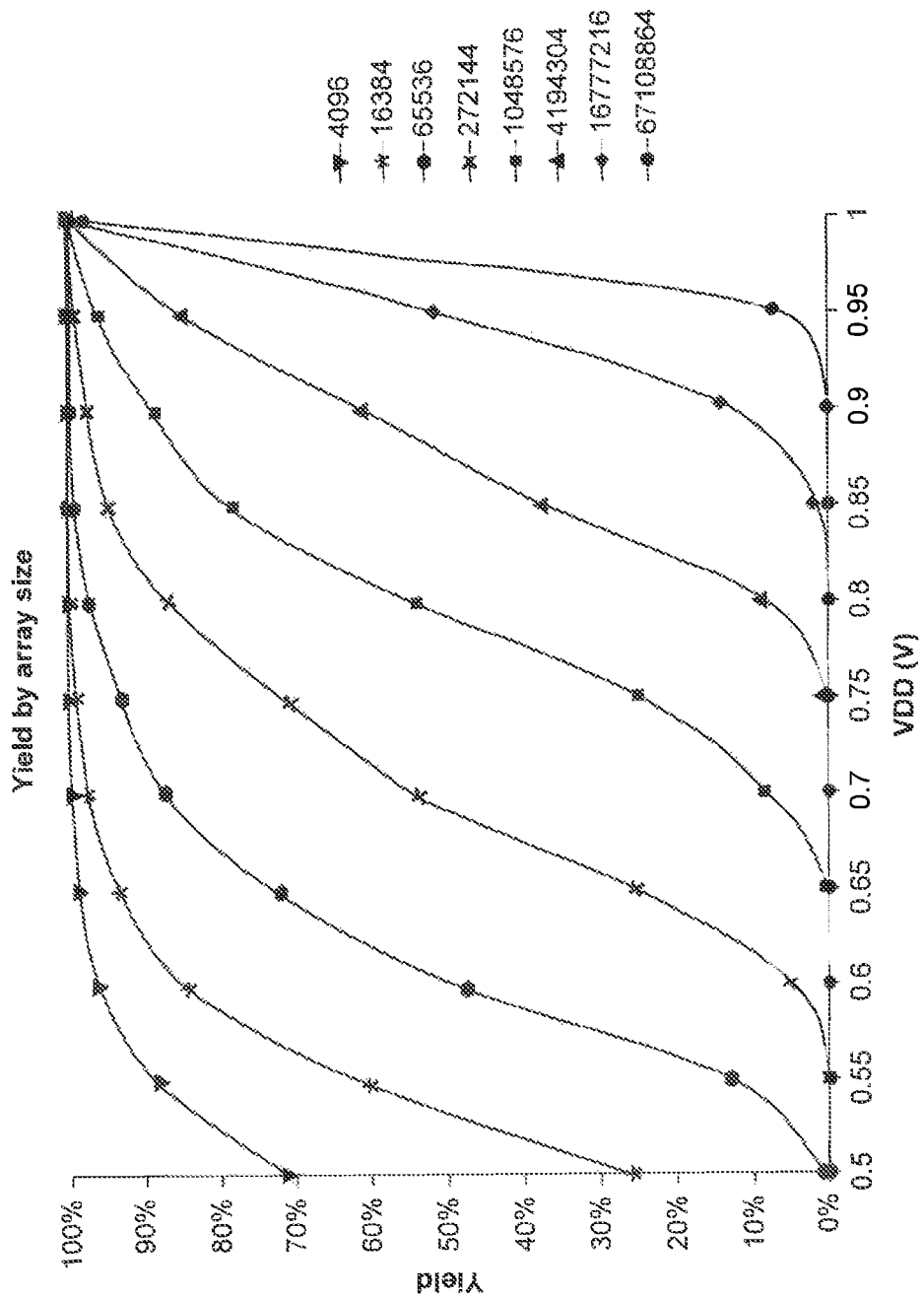
FIG. 3A shows a series of curves that represent yield versus supply voltage for eight different size memory arrays (i.e., 4 Kb, 16 Kb, 64 Kb, 256 Kb, 1 Mb, 4 Mb, 16 Mb and 64 Mb), each memory array being comprised of six-transistor CMOS SRAM bit cells, with the transistors being conventional planar field effect transistors.
Figure 3B:
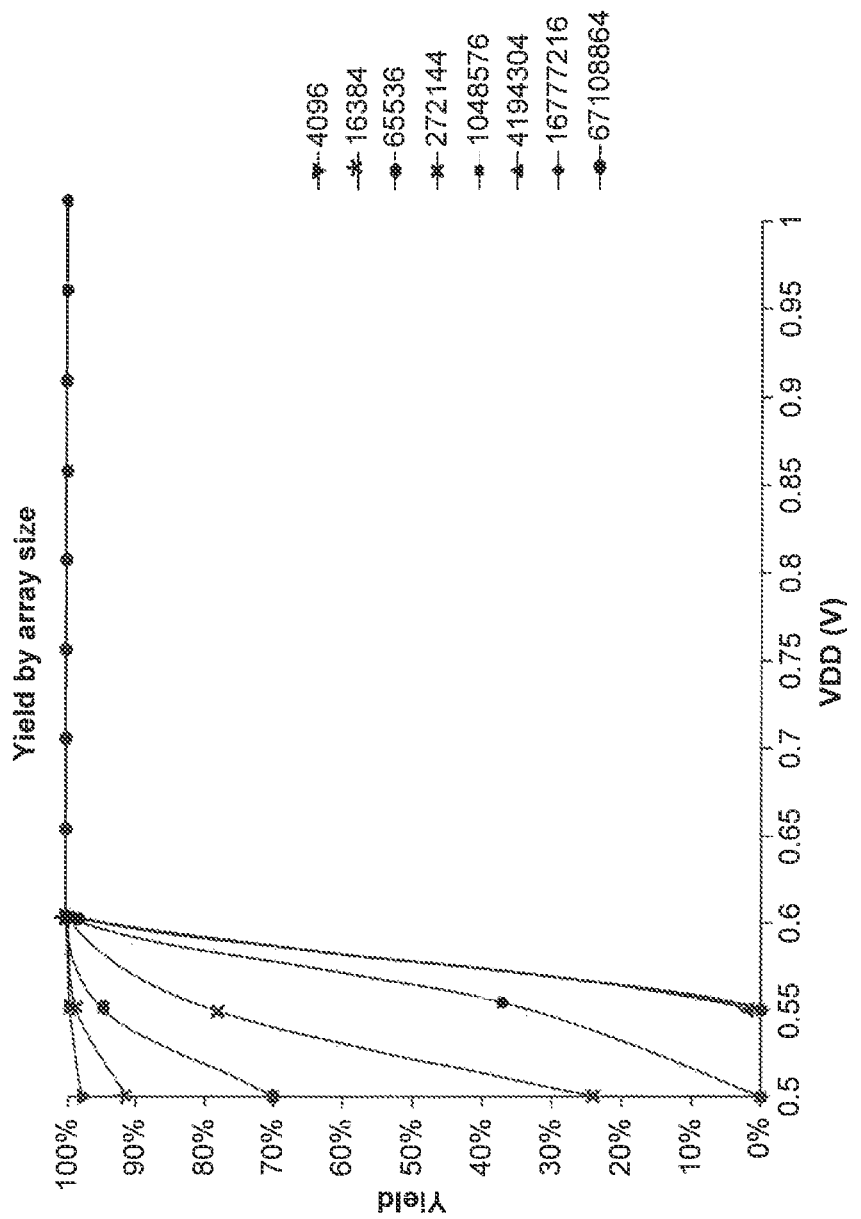
FIG. 3B shows a series of curves that represent yield versus supply voltage for eight different size memory arrays (i.e., 4 Kb, 16 Kb, 64 Kb, 256 Kb, 1 Mb, 4 Mb, 16 Mb and 64 Mb) each memory array being comprised of six-transistor CMOS SRAM bit cells, with the transistors being DDC planar field effect transistors.

In one embodiment, method 200 performs the computation for each operating condition within a range. In one embodiment, the operating condition can be the supply voltage (Vdd) and temperature (T) at which the circuit is operating. In alternative embodiments, the operating condition can include additional conditions such as, for example, the bias voltage applied to the screening region, such that the yield estimate can be obtained for a number of additional operating conditions. Examples of SRAM yield vs. supply voltage for varying SRAM array sizes are illustrated in FIGS. 3A and 3B, FIG. 3A illustrates yield estimates for a number of SRAM array sizes using a six-transistor SRAM cell, where the SRAM cell uses conventional transistors. FIG. 3B illustrates yield estimates for a number of SRAM array sizes using a six-transistor SRAM cell, where the SRAM cell uses DDC transistors.

In addition to plotting the yield estimates for different operating conditions, the data obtained from method 200 can be used as part of a yield improvement method that modifies the design of the predetermined circuit to improve the yield. The manner in which this is performed is circuit and metric dependent. For example, it can be observed through simulations of the 6T SRAM cell that conditions which improve read static noise margin are often detrimental to write margin, and vice versa. If the failures observed during the computations performed as part of method 200 are separated into read failures and write failures, it is possible to determine that for certain embodiments the failures are weighted more heavily towards one type. If this is the case, the 6T SRAM cell can be redesigned to adjust the mean operating point of the cell such that read and write failures are more evenly distributed, thereby reducing the total number of failures over the range of operating conditions and improving the yield.

In other embodiments, failures can be examined and sorted according to severity. For the NAND gate example discussed above, a NAND gate that fails the rise propagation delay constraint for certain operating conditions and for a certain permutation of variables, will still yield a specific rise propagation delay value. If the passing criterion is a rise propagation delay that is less than or equal to 100 ps, one failure may register 101 ps while another may register 150 ps. The former failure barely fails the test, while the latter failure is a more severe failure. If the NAND gate is redesigned after yield analysis to improve the yield, the specific permutation of variables that resulted in the 150 ps delay can be used during the optimization of the rise propagation delay to ensure that the optimization parameters chosen satisfy the rise propagation delay goals for the worst case scenario. In other embodiments, the other evaluation metrics of the circuit can be re-optimized for their own worst case scenarios simultaneously to ensure that the result of the optimization does not result in optimizing the circuit for one evaluation metric at the expense of another evaluation metric.

Various embodiments of the methods described herein can reduce the number of simulations required to obtain yield estimates for a predetermined circuit. In particular, the methods described above are more efficient than Monte Carlo simulations, as they can be used to analyze the tail of the distribution directly. In addition, the methods described above can be used to obtain information regarding the relative severity of failing permutations for a circuit over a range of operating conditions, and therefore, enable the redesign and optimization of the circuit to optimize the yield. The methods described above are not limited to the examples of the NAND gate and 6T SRAM cell discussed herein. However, a the set of evaluation metrics that are analyzed to obtain the yield estimates can be different for each type of circuit, as will be understood by those skilled in the art. The methods described herein are applicable to circuits using DDC transistors and to circuits using conventional transistors.

Figure 4:
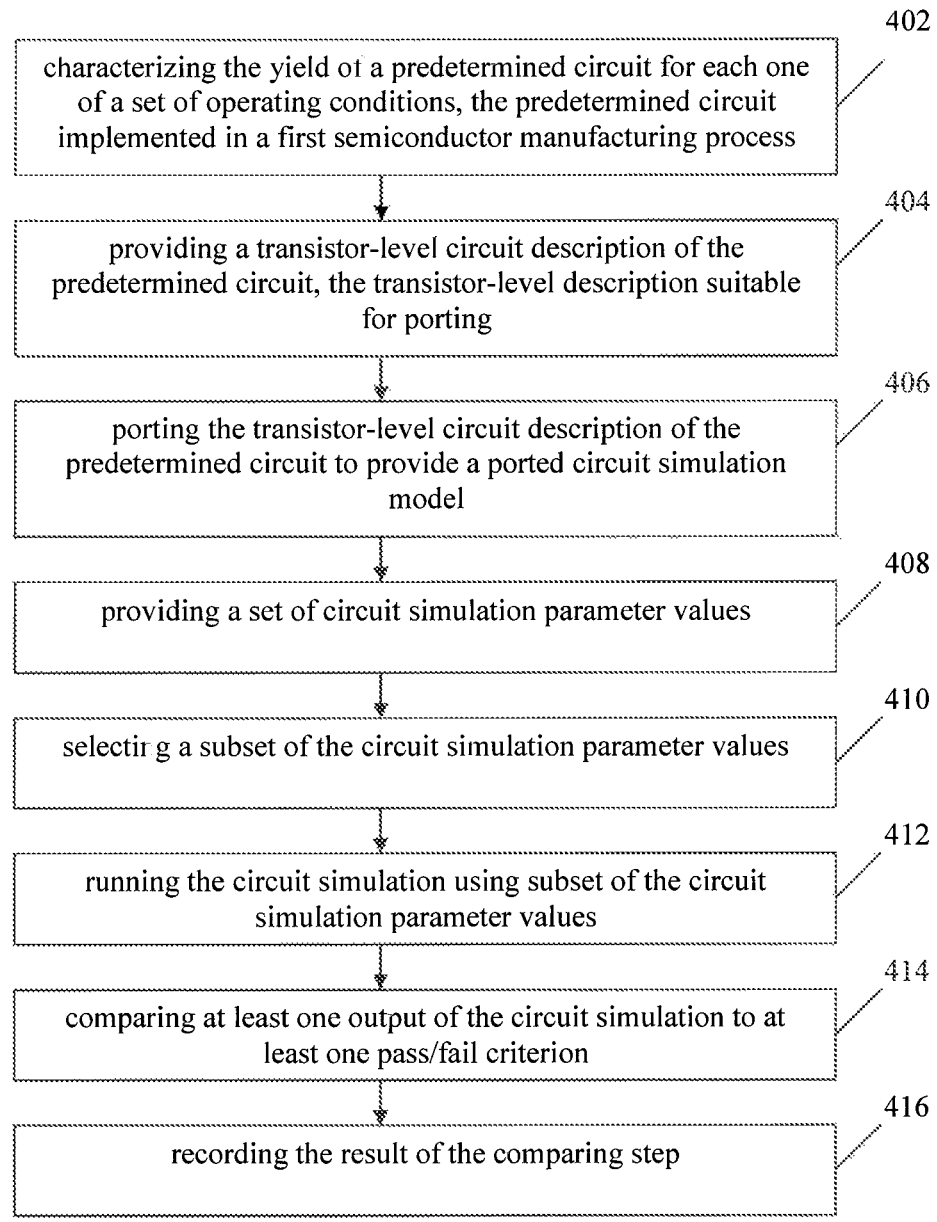
FIG. 4 is a flow diagram illustrating a method in accordance with the disclosure herein.

Referring to FIG. 4, in one illustrative embodiment, a method includes characterizing 402 the yield of a predetermined circuit for each one of a set of operating conditions, the predetermined circuit implemented in a first semiconductor manufacturing process; providing 404 a transistor-level circuit description of the predetermined circuit, the transistor-level description suitable for porting; porting 406 the transistor-level circuit description of the predetermined circuit to provide a ported circuit simulation model; providing 408 a set of circuit simulation parameter values; selecting 410 a subset of the circuit simulation parameter values; running 412 the circuit simulation using a subset of the circuit simulation parameter values; comparing 414 at least one output the circuit simulation to at least one pass/fail criterion; and recording 416 the result of the comparing step; wherein characterizing the yield comprises operating each one of a plurality of the predetermined circuits over a set of values within a predetermined range for at least one operating condition, and recording whether the predetermined circuit satisfies a predetermined performance constraint at each one of the set of values for the at least one operating condition. It is noted that the predetermined circuit may be any type of integrated circuit, including but not limited to a logic circuit, a standard cell, a memory bit cell, an SRAM cell, and so on.

In another illustrative embodiment, a method of designing a bit cell for use in an array of bit cells, the bit cell having a plurality of transistors each of which performs a specified function, the transistors each having a predefined performance parameter margin for the specified function, includes providing at least one targeted operating condition for the bit cell array; providing a value of sigma over a predefined range; determining for each transistor, at least one variable transistor characteristic, the transistor characteristic defined by a semiconductor process that results in a transistor having a substantially undoped transistor channel, the transistor channel being the region in which depletion occurs when a voltage is applied to a gate terminal of the transistor, the substantially undoped transistor channel being located vertically adjacent a heavily doped region, the heavily doped region setting the depletion width for the transistor; providing an array of instances based upon the value of the sigma and using a factorial calculation; providing a metric of interest by which to determine pass and failure instances; extracting individual pass and fail instances for the metric of interest; and determining a yield for the array of bit cells for the targeted operating condition. In this illustrative embodiment the bit cell is a six-transistor CMOS SRAM bit cell.

In another illustrative embodiment, an integrated circuit having at least one array of circuit cells, each circuit cell in the circuit cell array designed using a plurality of transistors each of which performs a specified function, the transistors each having a predefined performance parameter margin for the specified function, the circuit cells designed according to a method including providing at least one targeted operating condition for the bit cell array; providing a value of circuit level sigma over a predefined range; determining for each transistor, at least one variable transistor characteristic, the transistor characteristic defined by a semiconductor process that results in a transistor having such transistor characteristic; providing an array of instances based upon the value of the circuit level sigma; providing a metric of interest by which to determine pass and failure instances; extracting individual pass and fail instances for the metric of interest; and determining a yield for the array of circuit cells for the targeted operating condition.

In still other illustrative embodiments, a computer-aided design tool comprising a non-transitory computer-readable medium storing computer-executable instructions which, when executed by a processor, performs a method to increase the yield of an integrated circuit including an array of circuit cells, the method comprising: providing at least one targeted operating condition for the bit cell array; providing a value of circuit level sigma over a predefined range; determining for each transistor, at least one variable transistor characteristic, the transistor characteristic defined by a semiconductor process that results in a transistor having such transistor characteristic; providing an array of instances based upon the value of the circuit level sigma; providing a metric of interest by which to determine pass and failure instances; extracting individual pass and fail instances for the metric of interest; and determining a yield for the array of circuit cells for the targeted operating condition. Such embodiments may be described in the general context of computer-executable instructions, such as program modules, being executed by a computer. Generally, program modules include routines, programs, objects, components, data structures, etc. that perform particular tasks or implement particular abstract data types. Non-transitory computer readable medium include storage devices such as semiconductor memories, magnetic memories, and similar apparatus for storing program instructions.

Various embodiments described herein may be applied to integrated circuits that use multiple types of transistors, including conventional planar transistors, DDC transistors, transistors fabricated on SOI (silicon on insulator) substrates, and finFETs. Embodiments of the methods described herein may also be applied to integrated circuits that are configured to operate as "systems on a chip" (SoC), microprocessors, microcontrollers, graphics controllers, radio frequency circuits, memories, analog circuit blocks, digital circuit blocks, and that are capable of supporting a wide range of applications, including wireless telephones, mobile devices, communication devices, "smart phones", embedded computers, portable computers, personal computers, servers, and any other devices that can benefit from yield estimation and/or yield improvement. In alternative embodiments, the methods described herein may be applied to components and sub-systems of a SoC, instead of individual transistors, and operating conditions and evaluation metrics can be associated for each component and sub-system.

Aspects of the illustrative embodiments, or any part(s) or function(s) thereof, may be implemented using hardware, software modules, firmware, tangible computer readable media having instructions stored thereon, or a combination thereof and may be implemented in one or more computer systems or other processing systems.

CONCLUSION

It is to be appreciated that the Detailed Description section, and not the Abstract of the Disclosure, is intended to be used to interpret the Claims. The Abstract of the Disclosure may set forth one or more, but not all, illustrative embodiments of the invention, and thus, is not intended to limit the invention or the subjoined Claims in any way.

The exemplary embodiments described herein are provided for illustrative purposes, and are not limiting. Other embodiments are possible, and modifications may be made to the exemplary embodiments within the spirit and scope of the invention. Therefore, the Detailed Description is not meant to limit the invention. Rather, the scope of the invention is defined only in accordance with the subjoined Claims and their equivalents.

It is to be understood that the phraseology or terminology herein is for the purpose of description and not of limitation, such that the terminology or phraseology of the present specification is to be interpreted by those skilled in relevant art(s) in light of the teachings herein.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the subjoined Claims and their equivalents.

What is claimed is:

1. An integrated circuit fabricated in a preselected fabrication process, the integrated circuit designed using a computer-implemented method including the steps of:
    a) characterizing, by a computer, the yield of a predetermined circuit for each one of a set of operating conditions, the predetermined circuit implemented in a first semiconductor manufacturing process;
    b) providing a transistor-level circuit description of the predetermined circuit, the transistor-level description suitable for porting;
    c) porting the transistor-level circuit description of the predetermined circuit to provide a ported circuit simulation model;
    d) providing a set of circuit simulation parameter values;
    e) selecting, using, a factorial design of experiments, a subset of the circuit simulation parameter values;
    f) running the circuit simulation using the selected subset of the circuit simulation parameter values;
    g) comparing at least one output of the circuit simulation to at least one pass/fail criterion; and
    h) recording the result of the comparing step;
    wherein characterizing the yield comprises operating each one of a plurality of the predetermined circuits over a set of values within a predetermined range for at least one operating condition, and recording whether the predetermined circuit satisfies a predetermined performance constraint at each one of the set of values for the at least one operating condition.

2. The integrated circuit of claim 1, wherein operating each one of a plurality of predetermined circuits comprises coupling each one of the plurality of predetermined circuits to a tester, providing, by the tester, power to each of the circuits, providing, by the tester, driving waveforms, and measuring at least one output of the predetermined circuit.

3. The integrated circuit of claim 1, wherein the predetermined circuit is a logic circuit.

4. The integrated circuit of claim 1, wherein the predetermined circuit is as standard cell.

5. The integrated circuit of claim 1, wherein the predetermined circuit is a memory bit cell.

6. The integrated circuit of claim 1, wherein the predetermined circuit is an SRAM bit cell.

7. The integrated circuit of claim 1, wherein the predetermined circuit performs an analog function.

8. The integrated circuit of claim 1, wherein the set of operating conditions includes $V_{DDmin}$.

9. The integrated circuit of claim 1, the design of the integrated circuit further comprising the steps of;
    selecting a different subset of simulation parameter values from the set of simulation parameter values; and
    repeating steps (f), (g) and (h).

10. The integrated circuit of claim 5, wherein the at least one pass/fail criterion is selected from the group consisting of static noise margin, write margin, read current, retention state noise margin and writeability.

11. The integrated circuit of claim 5, wherein the at least one pass/fail criterion is selected from the group consisting of active power dissipation, leakage power dissipation and propagation delay.

12. An integrated circuit having at least one array of circuit cells, each circuit cell in the circuit cell array designed using a plurality of transistors each of which performs a specified function, the transistors each having a predefined performance parameter margin for the specified function, the circuit cells designed according to a computer implemented method including the steps of:
    providing at least one targeted operating condition for the bit cell array;
    providing, using a factorial design of experiments, a value of circuit level sigma over a predefined range;
    determining for each transistor, at least one variable transistor characteristic, the transistor characteristic defined by a semiconductor process that results in a transistor having such transistor characteristic;

providing an array of instances based upon the value of the circuit level sigma;

providing a metric of interest by which to determine pass and failure instances;

extracting individual pass and fail instances for the metric of interest; and determining a yield for the array of circuit cells for the targeted operating condition.

13. The integrated circuit of claim 12, wherein the array of circuit cells is an array of SRAM bit cells.

14. The integrated circuit of claim 13, wherein said metric of interest is selected from a group consisting of read static noise margin, write margin, read current, write delay, retention state noise margin, and leakage power.

15. The integrated circuit of claim 12, wherein the at least one variable transistor characteristics includes transistor threshold voltage.

16. The integrated circuit of claim 12, wherein said metric of interest is selected from a group consisting of active power dissipation, leakage power dissipation and propagation delay.

17. The integrated circuit of claim 12, wherein the plurality of transistors includes at least one DDC transistor.

18. The integrated circuit of claim 12, wherein the circuit cell design further includes the steps of:

simulating a circuit across a plurality of circuit level sigma values, wherein the device variations are chosen by the aggregate of the constituent devices; and using multiple simulation runs with each permutation of each device having positive, zero, or negative variation, wherein the multiple simulations encompass all permutations of the devices at the specified circuit level sigma.

19. The method of claim 18, wherein the plurality of circuit level sigma values are chosen from the low probability tail of the circuit level distribution.

20. A computer program product including a non-transitory computer-readable medium having instructions stored thereon that, if executed by a computing device, cause the computing device to perform operations for designing a circuit cell, the instructions comprising:

providing at least one targeted operating condition for the bit cell array;

providing a factorial design of experiments a value of circuit level sigma over a predefined range;

determining for each transistor, at least one variable transistor characteristic, the transistor characteristic defined by a semiconductor process that results in a transistor having such transistor characteristic;

providing an array of instances based upon the value of the circuit level sigma;

providing a metric of interest by which to determine pass and failure instances;

extracting individual pass and fail instances for the metric of interest; and determining a yield for the array of circuit cells for the targeted operating condition.

\* \* \* \* \*